(12) United States Patent
Brandon et al.

(10) Patent No.: US 11,590,465 B2
(45) Date of Patent: Feb. 28, 2023

(54) SYSTEM AND DEVICE FOR CUSTOMIZATION OF COSMETICS

(71) Applicant: Blee.LLC, Collierville, TN (US)

(72) Inventors: Charles C. Brandon, Collierville, TN (US); Travis Floyd, Collierville, TN (US); Walter J Wallace, Collierville, TN (US); Peter J Richards, Los Angeles, CA (US); Jenny L. Lam, Collierville, TN (US); Amanda D. Braught, Collierville, TN (US); Phillip A Powers, Germantown, TN (US); Mitch K Meiss, Nashville, TN (US); Dave A Seeman, Nashville, TN (US); Evan A Reese, Nashville, TN (US); Camille L B Cohen, Nashville, TN (US); Peter Phillips, Collierville, TN (US)

(73) Assignee: Blee. LLC, Collierville, TN (US)

( * ) Notice: Subject to any disclaimer, the term of this patent is extended or adjusted under 35 U.S.C. 154(b) by 0 days.

(21) Appl. No.: 17/744,512

(22) Filed: May 13, 2022

(65) Prior Publication Data

US 2022/0305450 A1    Sep. 29, 2022

Related U.S. Application Data

(63) Continuation of application No. PCT/US2021/046632, filed on Aug. 19, 2021.
(Continued)

(51) Int. Cl.
*B01F 33/84* (2022.01)
*B01F 101/21* (2022.01)

(52) U.S. Cl.
CPC ...... *B01F 33/8442* (2022.01); *B01F 2101/21* (2022.01)

(58) Field of Classification Search
CPC . B01F 33/8442; B01F 2101/21; A45D 44/005
See application file for complete search history.

(56) References Cited

U.S. PATENT DOCUMENTS 4,871,262 A * 10/1989 Krauss ................. G05D 11/133
                                                              366/605
5,163,010 A    11/1992 Klein et al.
(Continued)

FOREIGN PATENT DOCUMENTS

| WO | 8907294 A1 | 8/1989 |
| WO | 1998030189 A2 | 7/1998 |
| WO | 2017006018 A1 | 1/2017 |

OTHER PUBLICATIONS

IPRpctUS2021046632 dated May 9, 2022.
PCT written opinion, PCT/US18/43477 dated Nov. 6, 2018.

*Primary Examiner* — Elizabeth Insler
(74) *Attorney, Agent, or Firm* — Veritay Group IP PLLC; Susan Fentress; Liam O'Donnell

(57) ABSTRACT

The presently disclosed subject matter relates to a system and method for customizing a cosmetic product. The system includes: an interface device, in electronic communication with a single batch cosmetic device. A container configured, to be imported into the single batch cosmetic device containing a base. The single batch cosmetic device configured to formulate a customized cosmetic product by mixing a cosmetic additive with the base inside the imported container using at least one mixing element. The container exported from the single batch cosmetic device containing the customized cosmetic.

2 Claims, 17 Drawing Sheets

Related U.S. Application Data

(60) Provisional application No. 63/067,693, filed on Aug. 19, 2020.

(56) References Cited

U.S. PATENT DOCUMENTS

| | | | |
|---|---|---|---|
| 5,622,692 A | 4/1997 | Rigg et al. | |
| 5,681,550 A | 10/1997 | Rubino | |
| 6,510,366 B1 | 1/2003 | Murray et al. | |
| 6,856,861 B2 | 2/2005 | Dirksing et al. | |
| 6,935,386 B2 | 8/2005 | Miller et al. | |
| 7,174,310 B2 | 2/2007 | Bartholomew et al. | |
| 7,445,372 B1 | 11/2008 | Engel et al. | |
| 8,352,070 B2 | 1/2013 | Bartholomew et al. | |
| 8,532,736 B1 | 9/2013 | Malzbender et al. | |
| 8,573,263 B2 | 11/2013 | Bartholomew et al. | |
| 8,596,498 B2 | 12/2013 | Werner et al. | |
| 8,666,540 B2 | 3/2014 | Milhorn | |
| 8,702,772 B2 | 4/2014 | Luzon et al. | |
| 8,709,003 B2 | 4/2014 | Island et al. | |
| 8,830,468 B2 | 9/2014 | Igarashi | |
| 8,880,218 B2 | 11/2014 | Bartholomew et al. | |
| 8,884,242 B2 | 11/2014 | Chhibber et al. | |
| 8,908,904 B2 | 12/2014 | Santos et al. | |
| 8,915,562 B2 | 12/2014 | Edgar et al. | |
| 8,933,994 B2 | 1/2015 | Gross et al. | |
| 8,974,111 B2 | 3/2015 | Phallen | |
| 8,995,760 B2 | 3/2015 | Gill | |
| 9,064,180 B2 | 6/2015 | Korichi et al. | |
| 9,122,918 B2 | 9/2015 | Howell et al. | |
| 9,256,963 B2 | 2/2016 | Cummins et al. | |
| 9,449,400 B2 | 9/2016 | Stephan et al. | |
| 9,671,795 B2 | 6/2017 | Igarashi | |
| 9,691,213 B2 | 6/2017 | Bartholomew et al. | |
| 9,808,071 B2 | 11/2017 | Thiebaut et al. | |
| 9,858,685 B2 | 1/2018 | Nichol et al. | |
| 10,022,741 B2 | 7/2018 | Fuller et al. | |
| 10,271,629 B1 | 4/2019 | Nichol | |
| 10,366,513 B2 | 7/2019 | Nichol et al. | |
| 2001/0006486 A1 | 7/2001 | Ofverberg | |
| 2001/0047309 A1 | 11/2001 | Bartholomew et al. | |
| 2004/0191192 A1 | 9/2004 | Blankenbeckler et al. | |
| 2006/0152744 A1 | 7/2006 | Sanger | |
| 2008/0152678 A1 | 6/2008 | Shah et al. | |
| 2008/0311061 A1 | 12/2008 | Heuer | |
| 2009/0123402 A1 | 5/2009 | Oi | |
| 2011/0226803 A1 | 9/2011 | Schwartz | |
| 2013/0300919 A1 | 11/2013 | Fletcher et al. | |
| 2014/0081463 A1 | 3/2014 | Igarashi | |
| 2015/0107678 A1 | 4/2015 | Igarashi | |
| 2015/0314141 A1 | 11/2015 | Choi | |
| 2015/0315520 A1 | 11/2015 | Eppler et al. | |
| 2017/0151538 A1 | 6/2017 | Balooch et al. | |
| 2017/0154372 A1 | 6/2017 | Balooch et al. | |
| 2017/0197188 A1 | 7/2017 | Gunia et al. | |
| 2018/0199584 A1* | 7/2018 | Jaiswal | A23C 9/1223 |
| 2018/0284729 A1 | 10/2018 | Orsita et al. | |
| 2019/0200733 A1 | 7/2019 | Thiebaut et al. | |
| 2019/0321841 A1 | 10/2019 | Kim et al. | |
| 2019/0366285 A1 | 12/2019 | Brandon et al. | |
| 2019/0377368 A1 | 12/2019 | Besen et al. | |
| 2021/0267355 A1 | 9/2021 | Litner et al. | |

* cited by examiner

SYSTEM AND DEVICE FOR CUSTOMIZATION OF COSMETICS

CROSS REFERENCE TO RELATED APPLICATIONS

This application is a continuation of application PCT/US21/46632 filed Aug. 19, 2021 and U.S. provisional patent application Ser. No. 63/067,693 filed Aug. 19, 2020, under 35 U.S.C. § 111(a) (hereby specifically incorporated herein by reference).

STATEMENT REGARDING FEDERALLY SPONSORED RESEARCH OR DEVELOPMENT

None.

Reference to Sequence Listing, a Table for a Computer Program

Listing, Compact Disc Appendix

None.

TECHNICAL FIELD

The presently disclosed subject matter relates to an improved system and a method to deliver custom cosmetics.

BACKGROUND OF THE INVENTION

With the development of the beauty industry, users are increasingly interested in beauty products such as custom cosmetics and beauty services. Specifically, a user needs a single batch cosmetic device to customize a plurality of products based on a user's skin tone or preference.

In the field of custom cosmetics, skin coloration has been measured spectrophotometrically to provide a custom color. A mixing and dispensing device is electronically connected to a processor programmed to provide custom-blended cosmetics in a retail location/environment. In this device, color blenders, cosmetic bases, thinners, and additives are dispensed via a plurality of nozzles into a container and mixed. Various vibration mixers and shakers are used to mix the required ingredients. However, due to the number of ingredients being mixed and the complexity of the process, this device is only for commercial use. A need exists in the industry to produce a simple machine for in-home, salon, store, or alternative manufacturing use, while still providing users with the ability to customize a wide variety of cosmetic products.

Additionally, a need exists to sample cosmetic products hygienically in the post-COVID-19 retail environment. Retailers traditionally carried "tester" or "sample" products for customers to swatch or to try on in-store. In a post-COVID-19 world, this practice creates unnecessary health risks with person-to-person and surface contact. A need exists to effectively create sample-sized products on demand for users.

SUMMARY OF THE INVENTION

The inventive subject matter includes: a system to formulate a plurality of types of cosmetic products. This system includes: a computer application deployed on an interlace device to facilitate a cosmetic product selection and a cosmetic additive selection; wherein the cosmetic additive selection is comprised of an at least a color selection, wherein the cosmetic product selection is made of at least a product selection; a single batch cosmetic device in electronic communication with the interface device, wherein the interface device is configured to input the cosmetic product selection and the cosmetic additive selection to the single batch cosmetic device; the single batch cosmetic device comprised of: a computing system comprising: a controller configured to control the operations of the single batch cosmetic device, a plurality of cosmetic cartridges for the cosmetic additive, and a dispensing assembly, wherein the dispensing assembly is comprised of a plurality of fluid connections; wherein each of the fluid connections are in direct fluid connection with the plurality of cosmetic cartridges; and a plurality of pumps and a plurality of pump motors for controlling the dispensing of at least one dispensing unit of cosmetic additive from at least one of the plurality of cosmetic cartridges to dispense through at least one of the plurality of fluid connections; wherein the interface device is configured to input the command code to the dispensing assembly to dispense the at least one cosmetic additive; and a container comprising: a mixing assembly comprised of an at least one of a connecting mixer or an integrally located mixing element or a shaft with a mixing head, wherein the container contains a base-specific for the cosmetic product selection.

Another inventive aspect of this invention is a device for mixing a custom cosmetic product made of: a plurality of cosmetic cartridges filled with a cosmetic additive wherein each of the cosmetic cartridges is comprised of a pump and pump motor, and the plurality of cosmetic cartridges having at least one tube for extraction of the cosmetic additive; a dispensing assembly comprised of a plurality of fluid connections, wherein each of the plurality of fluid connections is in a direct fluid connection with one of the plurality of cosmetic cartridges and the removable container, wherein the plurality of fluid connections is configured to control the cosmetic additive flow along the at least one or more tubes of the cosmetic cartridge and at the dispensing tips of the dispensing assembly, and a container comprising: a mixing assembly comprised of an at least one of a connecting mixer or an integrally located mixing element or a shaft with a mixing head, wherein the container contains a base-specific for the cosmetic product selection.

The inventive subject matter also includes: a method to formulate a plurality of types of cosmetic products with a selected color. The steps of this method include: inputting a cosmetic selection into an interface device; inputting a color selection into the interface device to provide a selected cosmetic product, wherein the interlace device is in electronic communication with a single batch cosmetic device; connecting a container to a connecting mixer, the container containing a base for the selected cosmetic product into the single batch cosmetic device configured to formulate the plurality of custom cosmetic products, by dispensing of at least one dispensing unit of cosmetic additive from at least one of the plurality of cosmetic cartridges to dispense through at least one of the plurality of fluid connections using a dispensing assembly, mixing the cosmetic additive with the base in the container to form the selected cosmetic product with a selected color.

Advantages of the presently disclosed subject matter will become evident to those of ordinary skill in the art after a study of the description, Figures, and non-limiting Examples in this document.

DESCRIPTION OF EXEMPLARY EMBODIMENTS

The present invention can be understood more readily by reference to the following detailed description of the invention. It is to be understood that this invention is not limited to the specific devices, methods, conditions, or parameters described herein and that the terminology used herein is for describing embodiments by way of example only and is not intended to be limiting of the claimed invention. Also, as used in the specification including the appended claims, the singular forms "a," "an," and "the" include the plural, and reference to a numerical value includes at least that value unless the context dictates otherwise. Ranges can be expressed herein as from "about" or "approximately" one value and/or to "about" or "approximately" another value. When such a range is expressed, another embodiment includes from the one value and/or to the other value. Similarly, when values are expressed as approximations, by use of the antecedent "about," it will be understood that the value forms another embodiment. All combinations of method or process steps as used herein can be performed in any order, unless otherwise specified or clearly implied to the contrary by the context in which the referenced combination is made.

These and other aspects, features and advantages of the invention will be understood with reference to the detailed description herein and will be realized by means of the various elements and combinations particularly pointed out in the appended claims. It is to be understood that both the foregoing general description and the following detailed description of the invention are exemplary and explanatory of preferred embodiments of the inventions and are not restrictive of the invention as claimed. Unless defined otherwise, all technical and scientific terms used herein have the same meaning as commonly understood by one of ordinary skill in the art to which this invention belongs.

The present invention provides a system and method that allows a user to make selections (i.e., product selection and cosmetic additive or color selection) on a remote interface device that are communicated to a single batch cosmetic device to formulate a plurality of custom cosmetic products by mixing the selected cosmetic additive and the base in a cosmetic container using at least one mixing element, wherein the mixing element can be at least one of the but not limited to a insertable mixing head, cosmetic wand/applicator, blade, or other systems.

Figure 1:
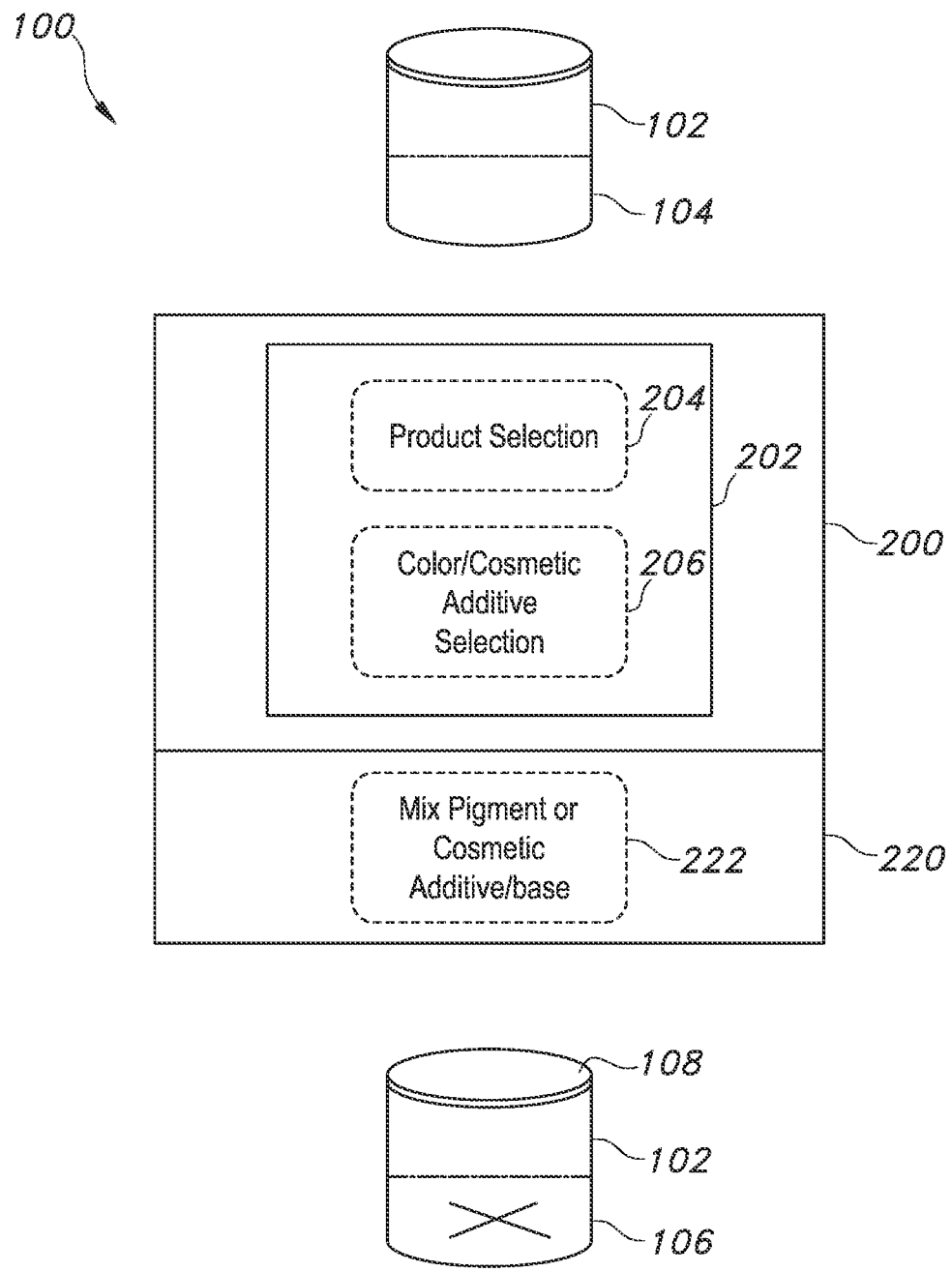
FIG. 1 is a general overview of the system.
Figure 2:
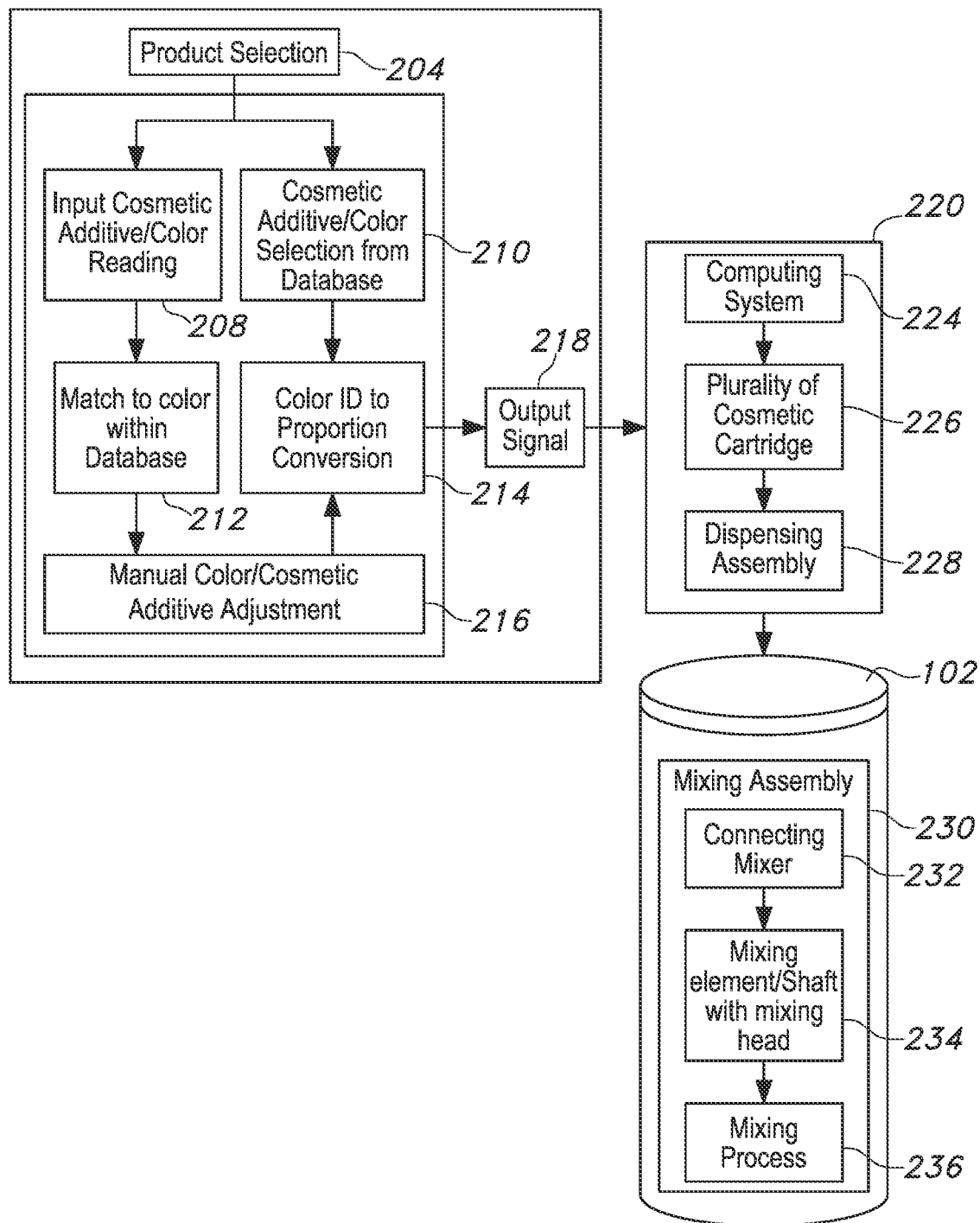
FIG. 2 is a more detailed overview of the system.

FIGS. 1 & 2 illustrates a system 100 for the automated delivery of customized cosmetics as a single batch is shown. The system 100 has three components: a computer application 202 deployed on the remote interface device 200 for product selection 204 and cosmetic additive or color selection 206, a single batch cosmetic device 220, and a container 102 containing a base product 104 specific for a type of cosmetic product of a plurality of types of cosmetic products. A single batch cosmetic device 220 is configured to process a single batch of the desired cosmetic. Single-batch cosmetics refer to individual units of a base product ready to be customized by a user. The user customizes product selection 204 and cosmetic additive or color selection 206 via the remote interface device 200 with the computer application 202. The same container 102 with the customized cosmetic product 106 is removed from the single batch cosmetic device 220. The dispensing assembly 228 of the single batch cosmetic device 220 is made of a plurality of fluid connections or plugs for dispensing cosmetic additives such as a pigment from the plurality of cosmetic cartridges 226 to the container 102.

In one embodiment, the remote interface device 200 includes a processor with a memory capable of running a computer application 202 for a user to make product and color or cosmetic additive selections. The remote interface device 200 also includes a display device through which the user makes selections. This could be a touch screen if the remote interface device 200 is a smartphone, laptop, PDA or tablet.

The single batch cosmetic device 220 can include a computing system 224. The computing system 224 can include either a microprocessor or a microcontroller. A microprocessor includes any of a type of miniature electronic device that contains the arithmetic, logic, and control circuitry necessary to perform the functions of a digital computer's central processing unit. A microcontroller is a small computer on a single metal-oxide-semiconductor (MOS) integrated circuit (IC) chip. A microcontroller contains one or more CPUs (processor cores) along with memory and programmable input/output peripherals.

The computing system 224 can receiver commands from remote interface device 200 to dispense cosmetic. Cosmetic cartridges, pumps, pump motors, mixer motors, and/or cosmetic applicator, mixer controllers, and/or mixer power sources can be connected to the microcontroller of the computing system 224.

The computing system 224 is configured to receive information from the cosmetic applicator, motor, or power source, circuit boards on the cosmetic cartridges, and/or pumps or motors. Information received can be spin speed of applicator, current of a motor, and/or contents of a cosmetic cartridge. The computer application 202, in one embodiment is configured to predict product type and fill level of the container 102 from the current being supplied to the motor. The computer application 202 can relay this information to the user. Specifically, if the base product type in the container 102 is predicted to be different than selected or container fill level is too high or too low the computer application 202 can inform a user the conditions.

The cosmetic additive or color can be selected in two ways. First, the user can select a cosmetic additive or color from a database 210 of colors. Second, the user can match a cosmetic additive or color, read from an input 208 such as from a picture or photographic image. The user can match a color from an inputted image to a color within the database 212. The step of color matching involves providing the computer application 202 with an image to extract color information, wherein the extraction step involves picking a color from the image and identifying the color proportion value. Once a color is finalized, the representative proportion value of the color is identified 214 and electronically communicated 218 to the single batch cosmetic device 220.

In one example, the user can perform manual color/cosmetic additive adjustment 216 to select a desired color/cosmetic additive.

The single batch cosmetic device 220 has the operational mode of mixing the pigment or cosmetic additive and the base 104. The single batch cosmetic device 220 can customize color cosmetics including but not limited to: liquid makeups (such as concealer or foundation), liquid lip products (such as lip gloss or liquid lipstick), liquid eye products (such as mascara or eyeshadow) and nail polishes of a specified shade or composition. A container 102 containing a base product 104 for a specified cosmetic is inserted into a single batch cosmetic device 220 for each cosmetic product that is desired. Each container 102 is sized to be imported into the single batch cosmetic device 220. In one example, the containers 102 can be sealed with a lid or cap 108 to retain the customized cosmetic product 106 within the container 102.

Each of the containers 102 contain a base-specific for a type of cosmetic product of the plurality of types of cosmetic products. Precise amounts of cosmetic additives such as a pigment are dispensed from a plurality of cosmetic cartridges 226. The cosmetic cartridges 226 containing cosmetic additives according to the color identified or selected or other cosmetic additive chosen using the remote interface device 200 into the container 102 by the dispensing assembly 228. The container 102 with the mixing assembly 230 can store custom cosmetic product. The custom cosmetic product can be remixed by inserting into the container back into the single batch cosmetic device or other devices capable of operating with the mixing assembly, such as a portable mix actuator. An exemplary portable mix actuator is a small mixer actuator. In this way custom cosmetic products can be remixed to improve the mixture or can be reformulated with additional cosmetic additive, such as to darken or recolor a custom cosmetic product. The custom cosmetic product being remixable within a container provides the user with a higher quality custom cosmetic product, by enabling a user to create custom cosmetic product from settled or separated mixtures from previous product creation.

A mixing assembly 230 is made of a connecting mixer 232 and a mixing element/shaft with mixing head 234. The mixing assembly 230 mixes the custom cosmetic product 106 directly in each of the container 102 and can be integrally located within the container 102.

The mixing element 234 can be detachable and disposable or reusable mixing element. The mixing element 234 is made of metal, durable plastics, biodegradable plastics, or other material and can be easily cleaned inside the container by the user if preferred. An embodiment of the present invention provides a disposable mixing element 234.

In another embodiment, the plurality of cosmetic cartridges 226 is configured to hold cosmetic additive such as specific liquid pigment, other cosmetic additives, or other liquid that is dispensed in accurate amounts to mix with the base product to modify the base product for creating the custom cosmetic product 106. The cosmetic additive can be, for example, a pigment; formulation-adjusting additives such as thinners, product feel or texture altering agents; product differentiators such as glitter, shimmer, mattifying agents, holographic materials; or active ingredients for skincare such as SBF agents, acne treatment, blemish treatment, or hydrating treatments. The cosmetic cartridge can be deposable or refillable once the cosmetic additive is dispensed.

Figure 3:
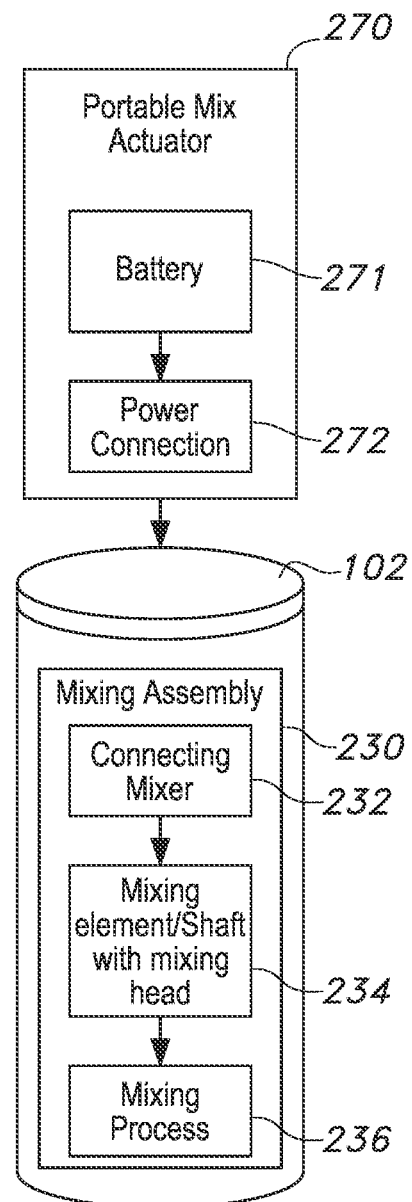
FIG. 3 illustrates an exemplary embodiment of a single batch cosmetic device.

Now referring to FIG. 3, the container 102 with the mixing assembly 230 can store custom cosmetic product. The custom cosmetic product can be remixed by inserting into the container back into the single batch cosmetic device or other devices capable of operating with the mixing assembly, such as a mixing device. An exemplary mixing device is portable mix actuator 270. In this way custom cosmetic products can be remixed to improve the mixture or can be reformulated with additional cosmetic additive, such as to darken or recolor a custom cosmetic product. A battery 271 provides power to the mixing assembly 230 on the container 102. The mixing assembly 230 can connect to the power connection 272 of the mixing device by a connecting mixer 232. The portable mixing assembly can also include a motor for spinning a mixing element 234. The portable mix actuator 270 initiates a mixing process 236. In some instances, a button is provided to institute the mixing process 236. The custom cosmetic product being remixable within a container provides the user with a higher quality custom cosmetic product, by enabling a user to revitalize custom cosmetic products from settled or separate mixtures from previous product creation.

Figure 4:
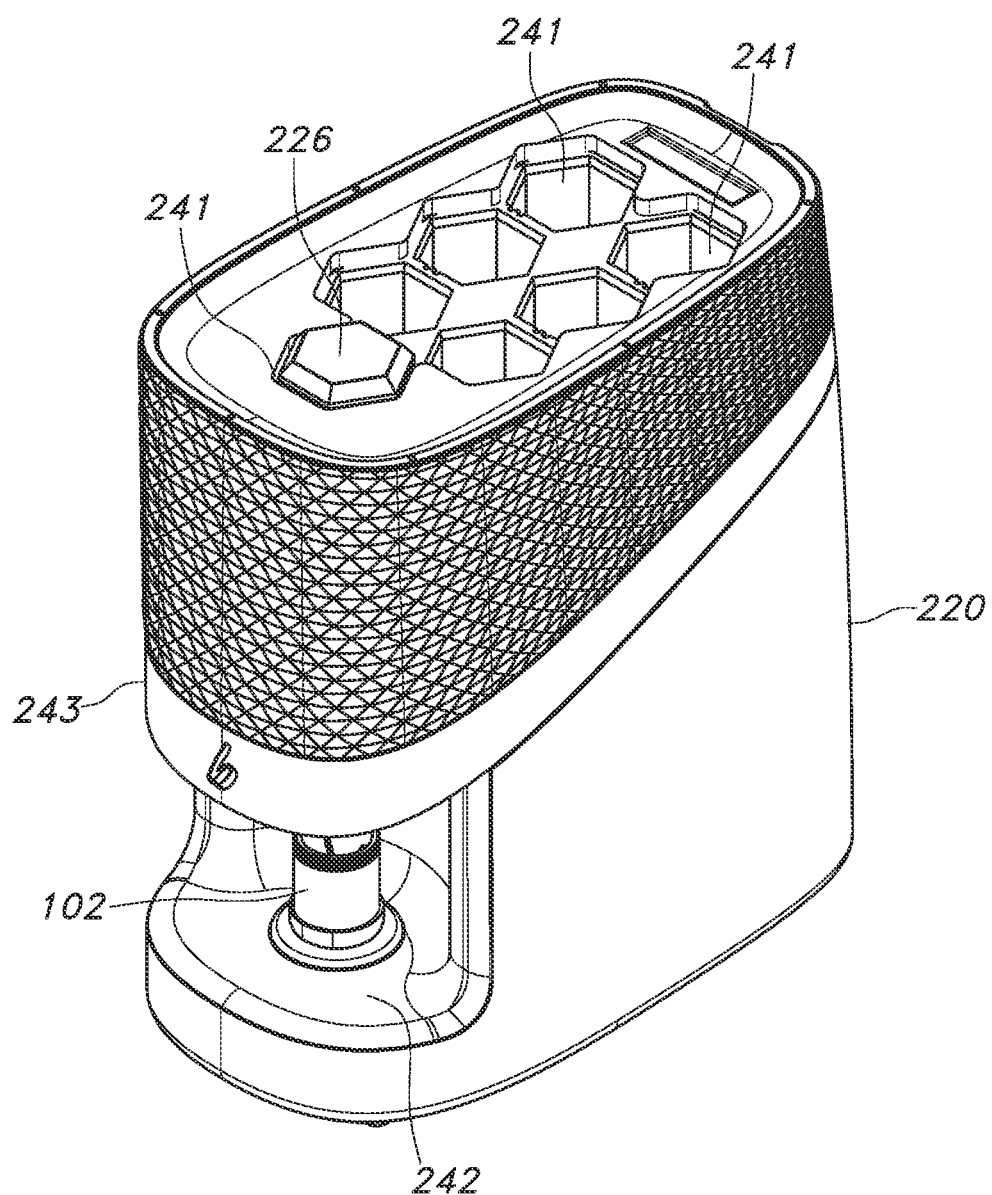
FIG. 4 illustrates an exemplary portable mixing device.

Now referring to FIG. 4, a single batch cosmetic device 220 in association with a container 102 is shown. The single batch cosmetic device 220 includes a bottom plate 242. The bottom plate 242 is a surface for placing the container 102 on the single batch cosmetic device 220. A plurality of cartridge slots 241 on top of the single batch cosmetic device 220 are configured to receive a plurality of cosmetic cartridges 226. A cosmetic cartridge 226 can be inserted or removed (pulled) from the cartridge slot 241 in the housing 243 to be replaced or refilled. A housing 243 can hold internal components of the device.

The housing 243 in one embodiment is size for home use, such as 9 inches in height, 9 inches in depth, and 5 inches in width. Other comparable sizes are envisioned. Larger single batch cosmetic device 220 such tripling or doubling the size or more the size can be used and hold additional plurality of cosmetic cartridges 226. The housing 243 preferably has a plurality of cartridge slot 241 openings corresponding to the number and shape of the plurality of cosmetic cartridges 226. The housing 243 can hold the parts of the dispensing assembly 228 of FIG. 2, including a plurality of conduits 252, a plurality of fluid connections 256, a plurality of pumps 254, and a dispensing head 255, all shown in FIG. 5 and described below.

Figure 5:
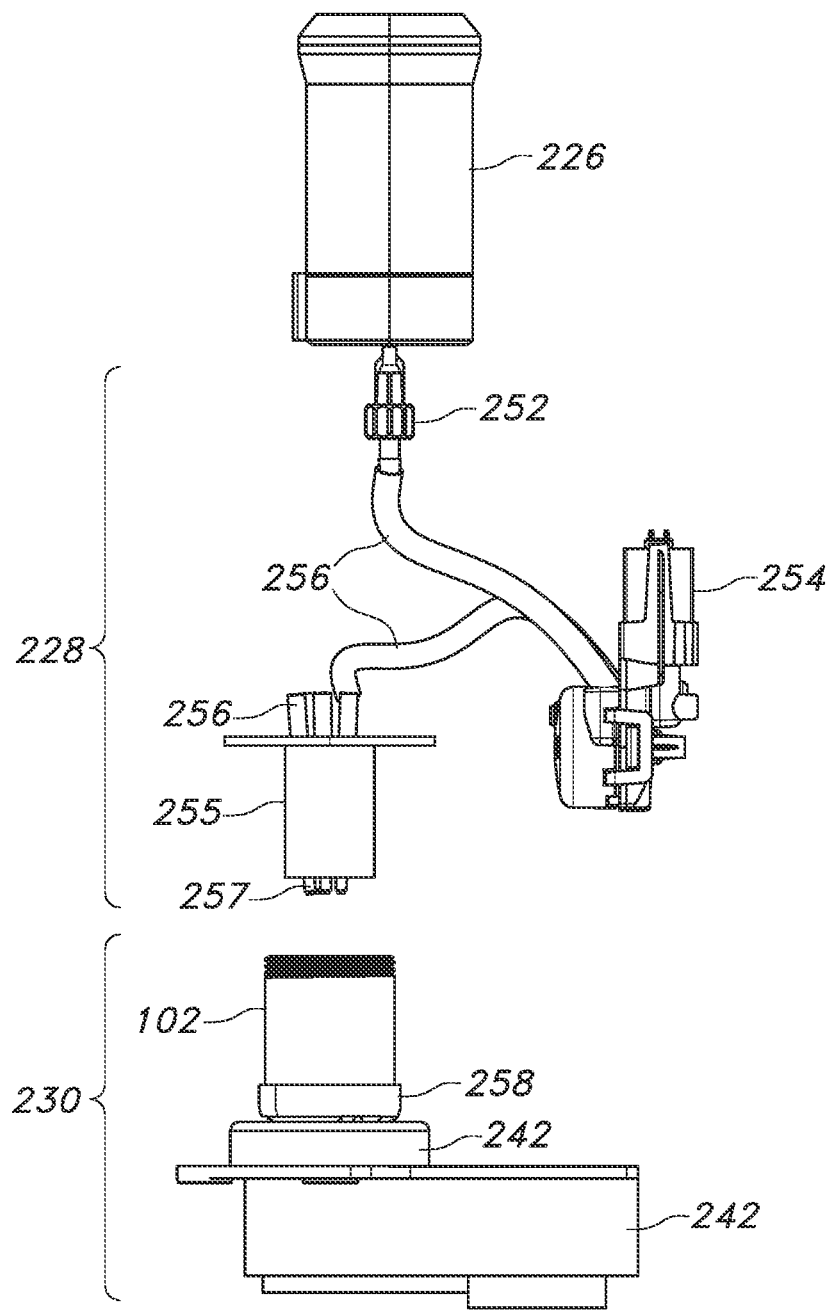
FIG. 5 illustrates an exemplary internal components of a single batch cosmetic device.

Now referring to FIG. 5, the internal components of a single batch device 220 are shown. One pump 254, a fluid connection 256, and a cosmetic cartridge 226 of the plurality thereof is shown in FIG. 5. The figure additionally shows partial fluid connections 256 of the additional cosmetic cartridges (not shown). FIG. 5 additionally shows an exemplary connecting mixer 232 of the present invention.

In a one embodiment, the dispensing assembly 228 of the single batch cosmetic device 220 is made of a plurality of fluid connections or plugs for dispensing cosmetic additives such as a pigment from the plurality of cosmetic cartridges 226 to the container 102. The plurality of fluid connections or conduits 252 are attached to the fluid connection 256. The plurality of cosmetic cartridges 226, connect to at least one or more conduits 252 for extraction and/or dosing of the pigment or cosmetic additive. Conduits 252 attach to the cosmetic cartridges 226, opening a fluid connection between the cosmetic cartridge 226 and the conduit 252. In a preferred embodiment, conduits 252 are gauge luer needles attached to the bottom of the cosmetic cartridges 226. Gauge luer needles use a needle to pierce into the cosmetic cartridge 226 opening a fluid connection between the two.

In an embodiment, conduits 252 pierce soft membranes (not shown) on the bottom of the cosmetic cartridge 226. The soft membranes can be made out of soft plastic or other similar material. The soft membrane can be pierced by the conduits 252 while returning to their initial closed state, blocking fluid flow out of the cosmetic cartridge 226, when pulled from the connection by a user. A user can remove a cosmetic cartridge 226 for refilling of cosmetic additive. Alternatively, cosmetic cartridges 226 can be refilled without removal of the cosmetic cartridge 226 from the housing 243.

A plurality of fluid connections 256 fluidly connect to the plurality of cosmetic cartridges 226. Fluid connections 256 are hollow tube structures through which cosmetic additive can flow. They allow cosmetic additive to flow from the plurality of cosmetic cartridges 226 to the dispensing point 257. A dispensing head 255 surrounds the plurality of fluid connections 256 at the dispensing point 257 shown above the container 102. A plurality of pumps 254 directs cosmetic additive from the plurality of cosmetic cartridges 226 to the container 102. The plurality of fluid connections 256 can include valves (not shown) such as solenoid, manual valves, pressure valves, or check valves. Valves, if used in the device, are preferably duckbill valves, particularly 3.2 mm diameter. Valves can help decrease flow of cosmetic additive when a particular fluid connection is not dispensing or can help increase the accuracy of pumping cosmetic additive. Alternatively, plugs can be included with the single batch cosmetic device 220 and are manually inserted into the plurality of fluid connections 256 to block the flow of additive from fluid connections.

In one embodiment, at least one pump 254 enables cosmetic additive to flow through a fluid connection 256. The at least one pump 254 is configured to be driven by a power source connected to a single batch cosmetic device 220 or using a built-in battery. The at least one pump 254 is configured to dispense, from one pump cycle, dispensing units. The dispensing unit is the total amount of a particular cosmetic additive required to complete a customized cosmetic product. By avoiding unit-by unit dosing or the use of multiple active pumps on one fluid connection 256, through the use of pumps configured to release a dispensing unit, the total instances of error in the dispensing process are reduced. Reducing instances of error allows for cosmetic additive to be dispensed accurately. The at least one pump 253 are preferably peristaltic pumps, as shown in FIG. 5.

To further reduce dosing error, one active pump of the at least one pump 254 on a fluid connection 256 will cause cosmetic additive to dispense on a fluid connection of the plurality of fluid connections 256. The at least one pump 254 on each fluid connection 256 can have differing dispensing units depending on the properties of the cosmetic additive that is dispensed from that fluid connection 256. The internal components of the single batch device 220 can be further modified to include multiple pumps 254 on a fluid connection 256, wherein only one pump 254 is active on a particular fluid connection for dispensing of cosmetic additive for a cosmetic product. This allows for multiple pumps 254 corresponding to differing dispensing units. This modification broadens the range of cosmetic additive dispensable from a fluid connection 256, increasing color and product accuracy and options.

Figure 19:
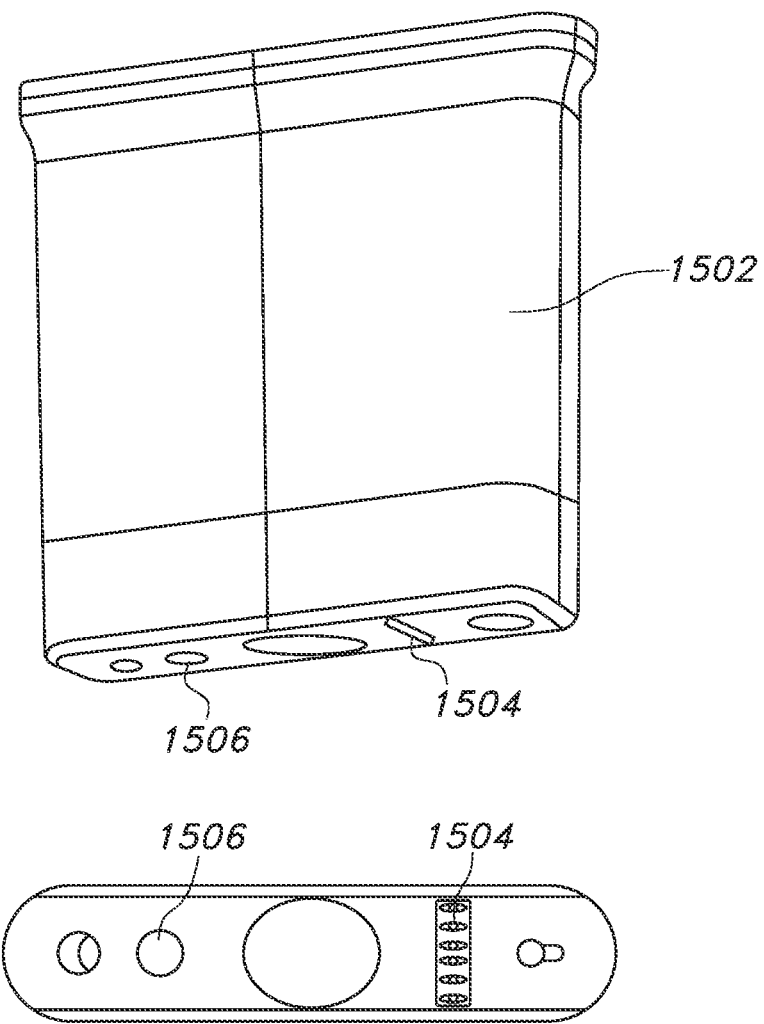
FIG. 19 shows a front side view of an exemplary cosmetic cartridge, in accordance with an exemplary embodiment of the present invention.

Now referring to FIG. 2, the connecting mixer 232 interacts with a mixing element 234. The connecting mixer 232 connects to the container 102 and interacts with a mixing element 234. FIGS. 4-5, and 19, show three differing structures of a connecting mixer 232, each explained below.

Now referring to FIGS. 2 and 4, in one exemplary embodiment, the connecting mixer 232 of FIG. 2, can be a bottom connecting mixer 258 on the bottom plate 242 of the single batch cosmetic device, as shown in FIG. 5. The bottom connecting mixer 258 holds the container 102 and can interact with a mixing element 234 inside the container 102 or spin the container 102. Exemplary mixing configurations attaching to the bottom connecting mixer 258 at least include FIGS. 6-7, 9-10, and 23, described below.

Figure 6:
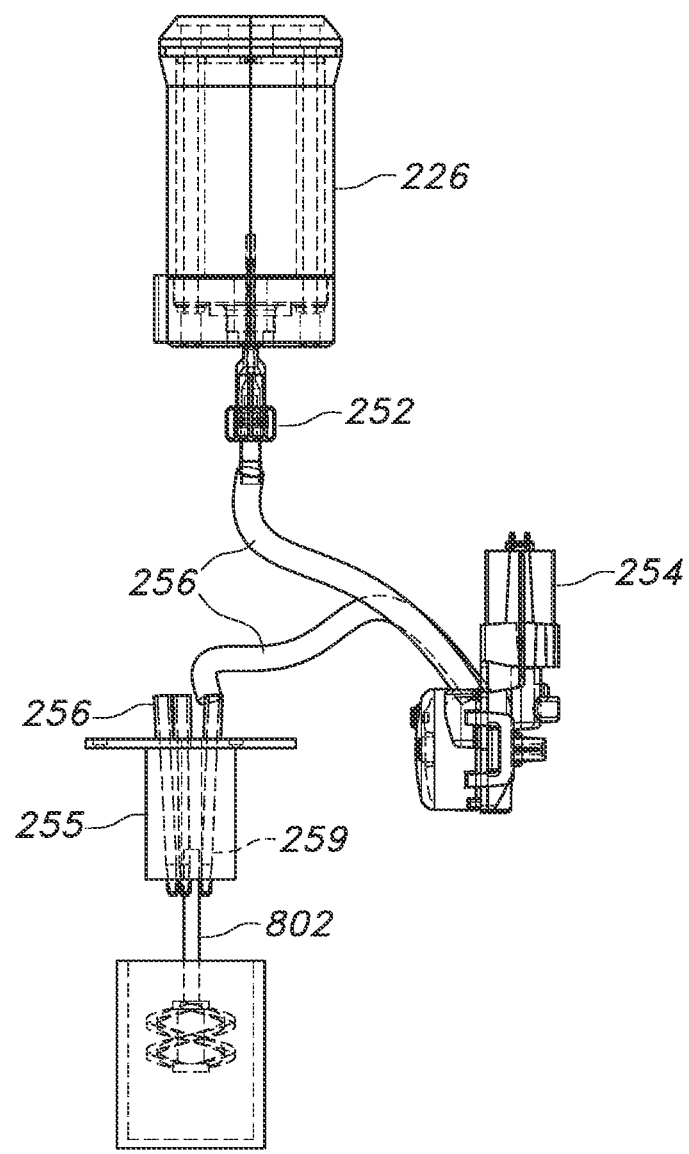
FIG. 6 illustrates an exemplary internal components of a single batch cosmetic device with a mixing element.

Now referring to FIGS. 2 and 6, in one exemplary embodiment, the connecting mixer 232 of FIG. 2 can be a top connecting mixer 259 on the dispensing head 255 of the single batch cosmetic device. The top connecting mixer 259 can be configured to spin a mixing element within the container 102 or hold a mixing element within the container of 102. The mixing shaft 802 attaches to a top connecting mixer 259 of FIG. 6. Exemplary mixing configurations attaching to the top connecting mixer are shown in FIGS. 9, 12-14, 18, and 22, described below.

Now referring to FIGS. 2, 15-17 and 20-21, in another exemplary embodiment, the connecting mixer 232 of FIG. 2 can be a container lid 260, as shown in FIGS. 15-17 and 20-21, described below.

A fourth embodiment utilizes both the top connecting mixer 259 of FIG. 6 and the bottom connecting mixer 258 of FIG. 5. In this embodiment, the mixing configurations of FIGS. 9, 12-14, 18, and 22 can connect to the top connecting mixer 259 of FIG. 6 while the container 102 connects to the bottom connecting mixer 258 of FIG. 5. In this embodiment, a mixing element attached to the top connecting mixer 259 of FIG. 6 remains stationary while the container 102 can spin or rotate by the bottom connecting mixer 258 of FIG. 5 to agitate cosmetic additive and the base product within the container 102.

Figure 7:
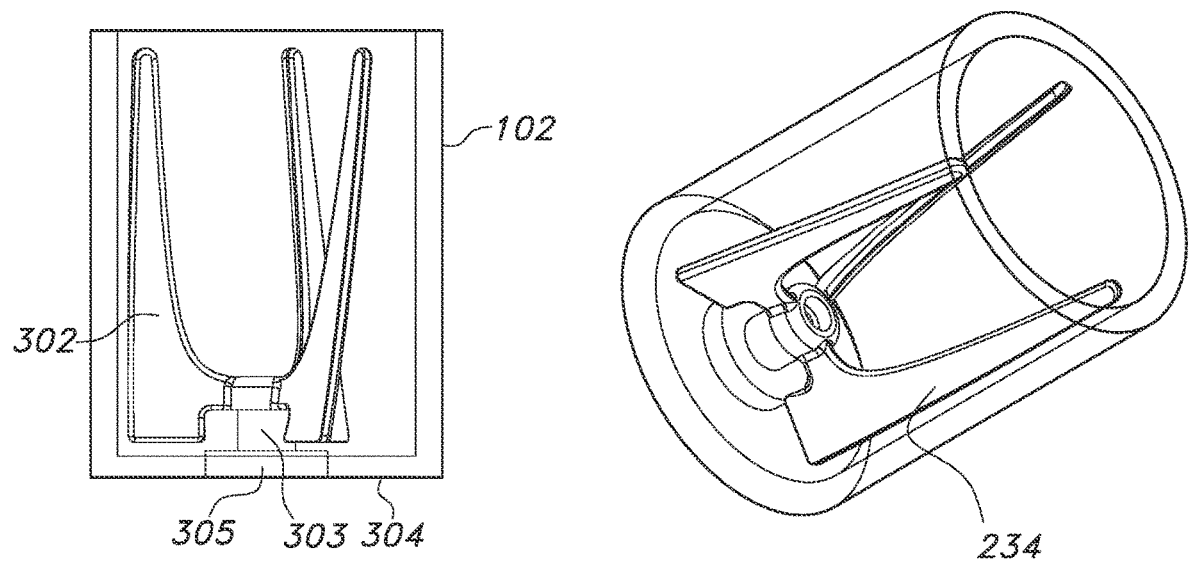
FIG. 7 illustrates an isometric view of a propeller or impeller mixer at the bottom side of the container.

FIG. 7 illustrates an isometric view of a propeller/impeller mixer at the bottom side of the container 102. The mixing element 234 such as a propeller or an impeller mixer 302 is detachably connected at a center of the bottom side 304 inside the container 102. The mixing element 234 attaches to the bottom connecting mixer 258 of FIG. 4. More specifically the mixing element 234 is made of a female mixing element 302 connected to a shaft 303 driven by a motor 305. In this exemplary configuration, the propeller, or an impeller mixer 302 is configured to mix the base product with the cosmetic additive to create a customized cosmetic product needed by the user. The propeller or the impeller mixer 302 can be at least one of an open, semi-open, or enclosed impeller for providing radial, axial, or mixed flow.

Figure 8:
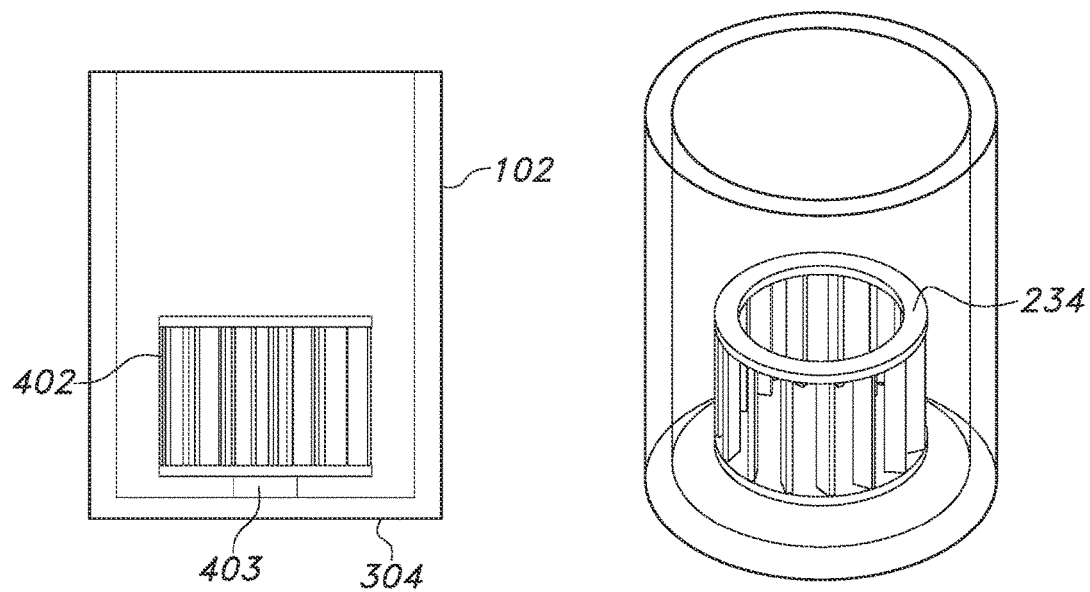
FIG. 8 illustrates an isometric view of a squirrel cage/gate/brace mixer connected at the bottom side of the container.

FIG. 8 illustrates an isometric view of a squirrel cage mixer. The mixing element 234 in this exemplary embodiment is a squirrel cage mixer 402 is attached to the bottom connecting mixer 258 of FIG. 5. The squirrel cage mixer 402 spins to mix the base product with the cosmetic additive to create a customized cosmetic product needed by the user. More specifically the mixer is made of mixing element 402 connected to a shaft 403 driven by a motor (not shown).

Figure 9:
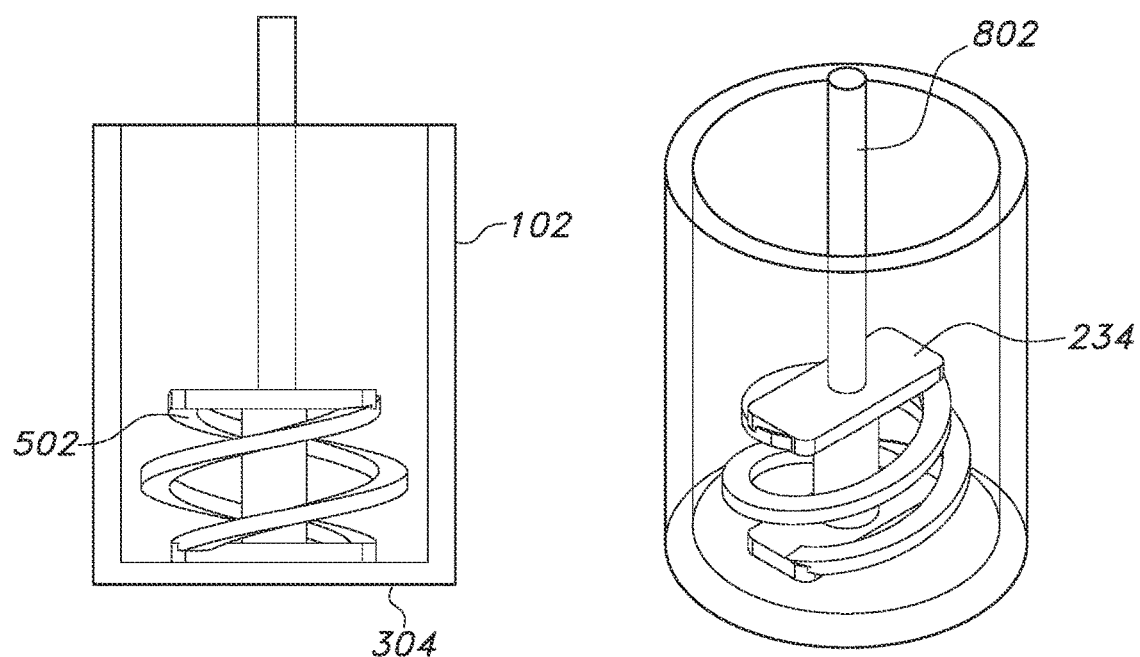
FIG. 9 illustrates an isometric view of a helical/spiral/screw mixer connected at the bottom side of the container, in accordance with an exemplary embodiment of the present invention.

FIG. 9 illustrates an isometric view of a screw shaped mixer. The mixing shaft 802 attaches to a top connecting mixer 259 of FIG. 6. The screw mixer can be of a helical or spiral shape. The mixing element 234 mixes the content inside the container 102.

Figure 10:
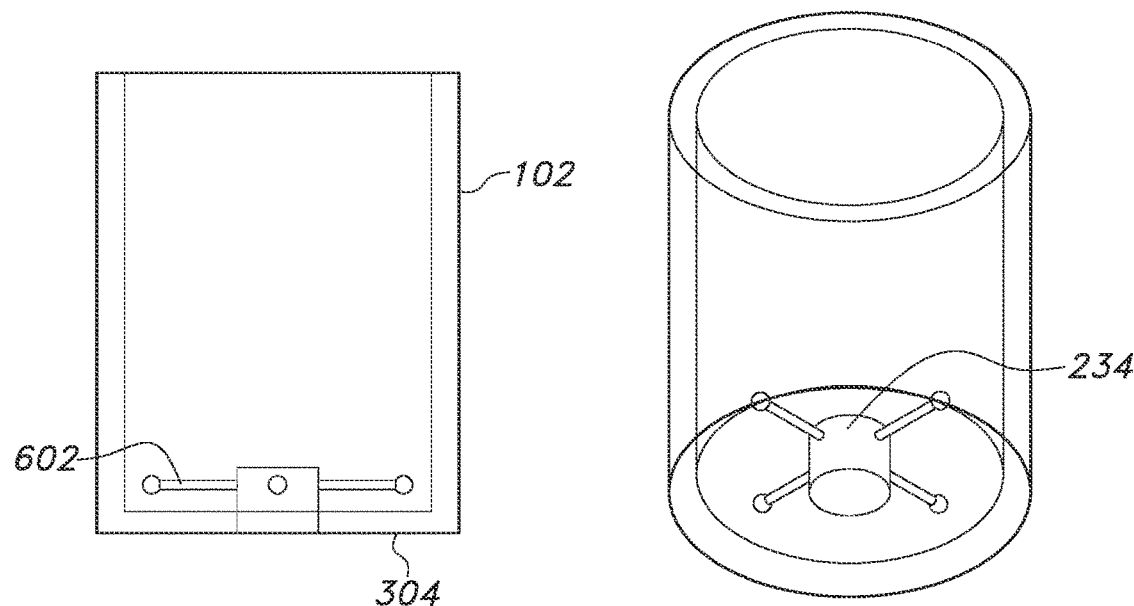
FIG. 10 illustrates an isometric view of a matchstick mixing element connected at the bottom side of the container, in accordance with an exemplary embodiment of the present invention.

FIG. 10 illustrates an isometric view of a matchstick mixing element at the bottom side 304 of the container 102. The mixing element 234 attaches to the bottom connecting mixer 258 of FIG. 5. The mixing element 234 in this embodiment is a matchstick mixing element 602 attached at a center of the bottom side 304 inside the container 102 and spins or rotates to mix the content at a top side or inside the container 102. More specifically the mixer is made of mixing element 602 connected to a shaft 603 driven by a motor (not shown). The mixing element 234 is detachably attached at a center of the bottom side 304 inside the container 102 to mix the content inside the container 102.

Figure 11:
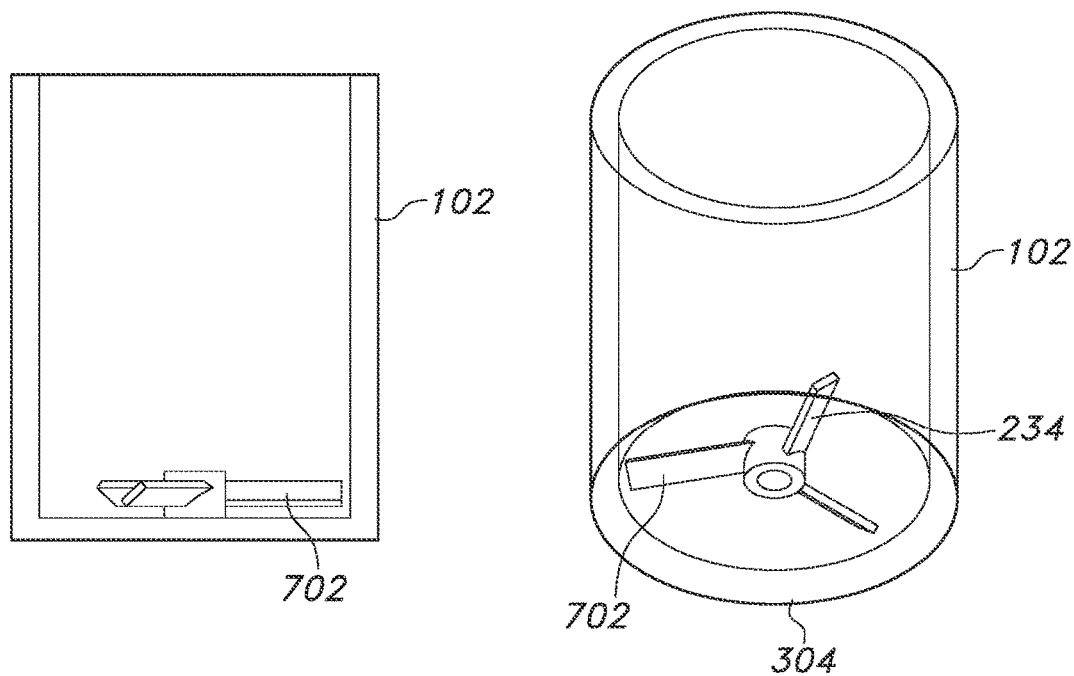
FIG. 11 illustrates an isometric view of a homogenizing tip/impeller blade connected at the bottom side of the container, in accordance with an exemplary embodiment of the present invention.

FIG. 11 illustrates an isometric view of a homogenizing tip/impeller blade 702 at the bottom side 304 of the container 102, in accordance with an exemplary embodiment of the present invention. An impeller blade is formed from a plurality of agitator blades connected to a baseplate. The mixing element 234 attaches to the bottom connecting mixer 258 of FIG. 5. The mixing element 234 is detachably attached and can be powered to mix the content inside the container 102.

Figure 12:
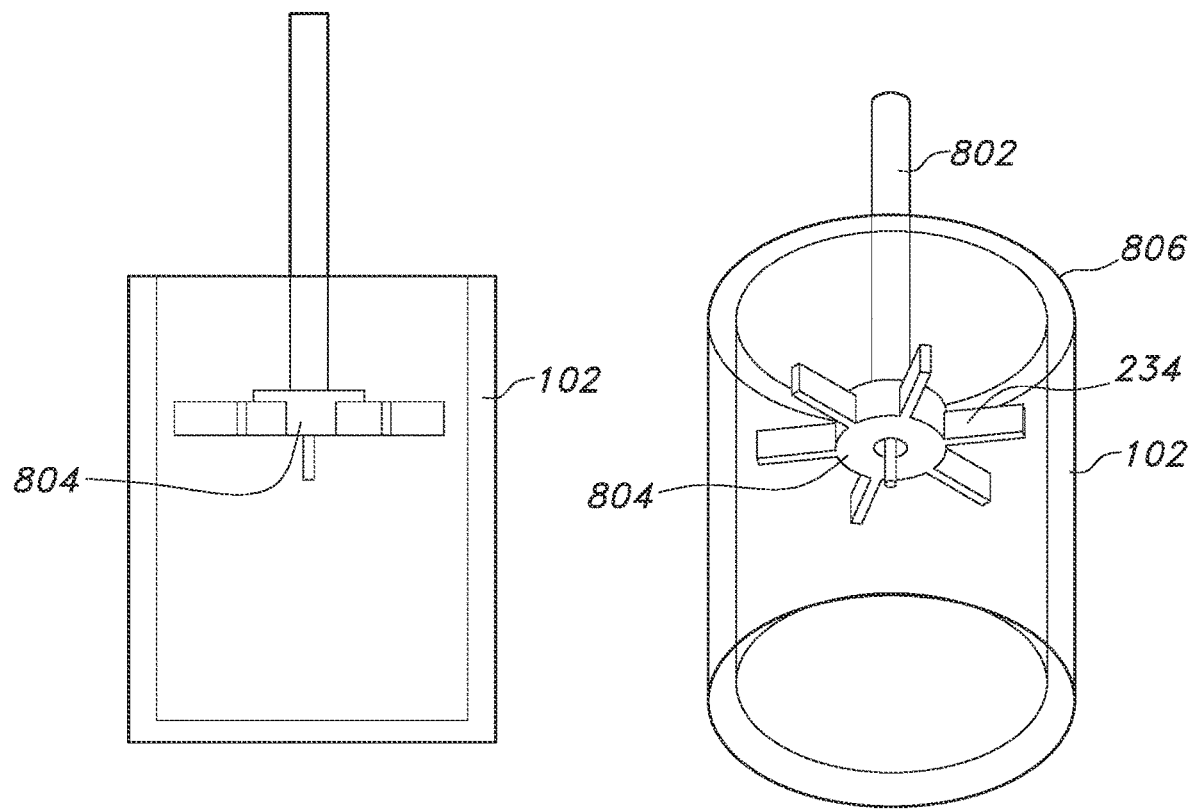
FIG. 12 illustrates an isometric view of a mixing shaft and mixer inserted from a top side of the container, in accordance with an exemplary embodiment of the present invention.

FIG. 12 illustrates an isometric view of a mixing shaft and mixer inserted from the top side of the container 102, in accordance with an exemplary embodiment of the present invention. The mixing shaft 802 attaches to a top connecting mixer 259 of FIG. 6. The mixing element i.e., mixing shaft 802 and mixing head 804 are inserted from the top side 806 of the cosmetic container 102. The mixing element can be a disposable or reusable mixing element. The mixing head 804 is attached at one end of the mixing shaft 802. In one example, the mixing shaft 802 having at least one or more fluid conduits for the transfer of the pigment or cosmetic additive from the cosmetic cartridge to the container 102 having the base product. The mixing shaft 802 and mixing head 804 spins to agitate the pigment or cosmetic additive with the base product to create a customized cosmetic product in the container 102.

Figure 13:
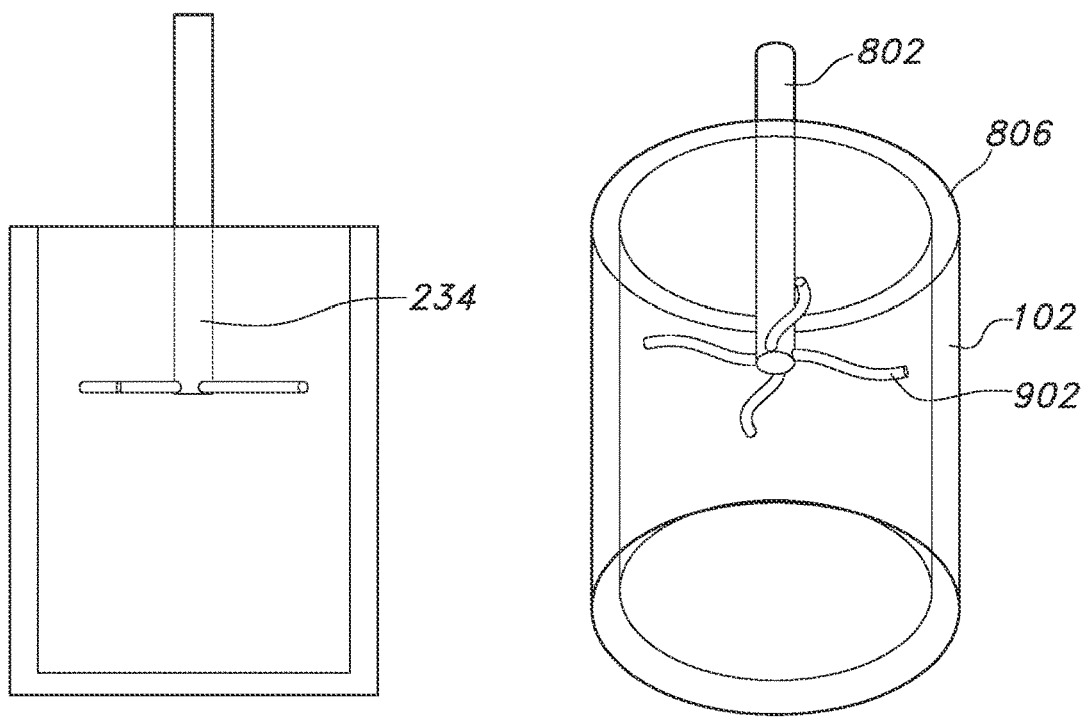
FIG. 13 illustrates an isometric view of a generic mixer inserted from the top side of the container, in accordance with an exemplary embodiment of the present invention.

FIG. 13 illustrates an isometric view of a generic mixer 902 inserted from the top side 806 of the container 102, in accordance with an exemplary embodiment of the present invention. The mixing shaft 802 attaches to a top connecting mixer 259 of FIG. 6. The mixing element 234 can be impeller blade, homogenizer, screw, or another type mixing device attached to the mixing shaft 802. The mixing element can be a disposable or reusable mixing element.

Figure 14:
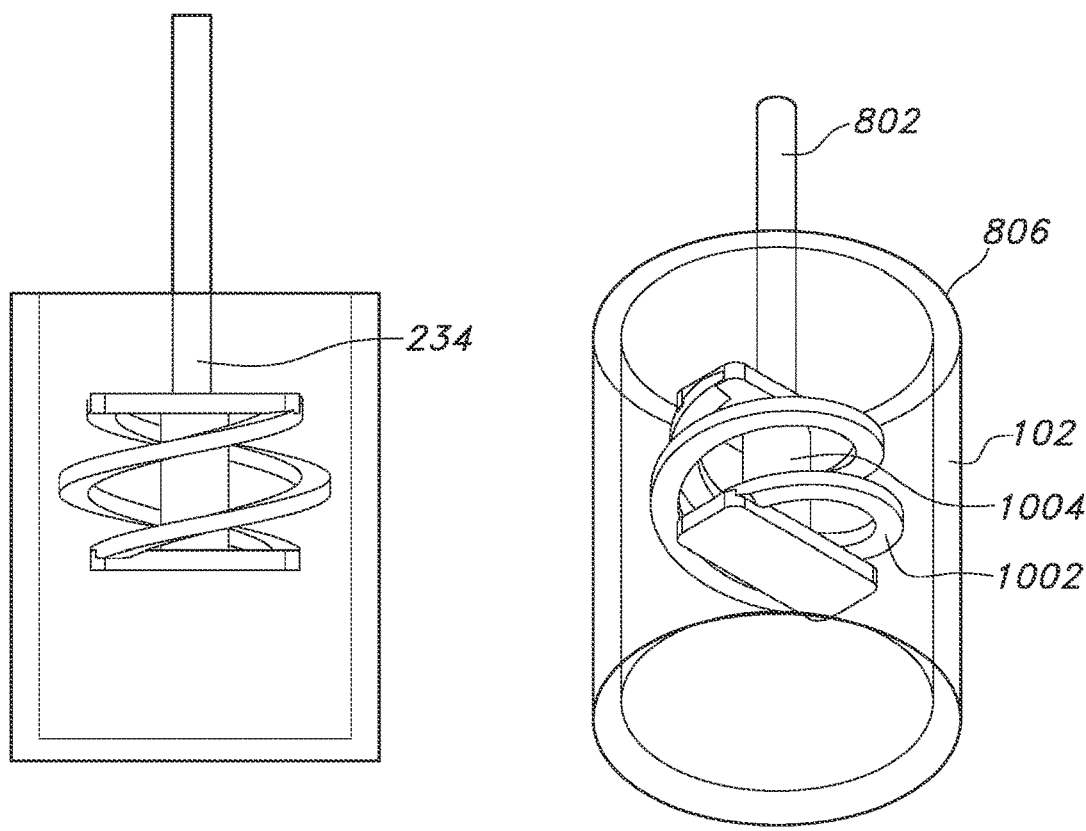
FIG. 14 illustrates an isometric view of a helical/screw mixer inserted from the top side of the container, in accordance with an exemplary embodiment of the present invention.

FIG. 14 illustrates an isometric view of a helical/screw mixer inserted from the top side 806 of the container 102, in accordance with an exemplary embodiment of the present invention. The mixing shaft 802 attaches to a top connecting mixer 259 of FIG. 6. The mixing element 234 i.e., helical/screw mixer 1002 is attached to a shaft 1004 of a standard applicator such as liquid lip product applicator, or nail brush applicator to create/design a helical/screw shaft which spins to mix the content cosmetic additive and base product) inside the container.

Figure 15:
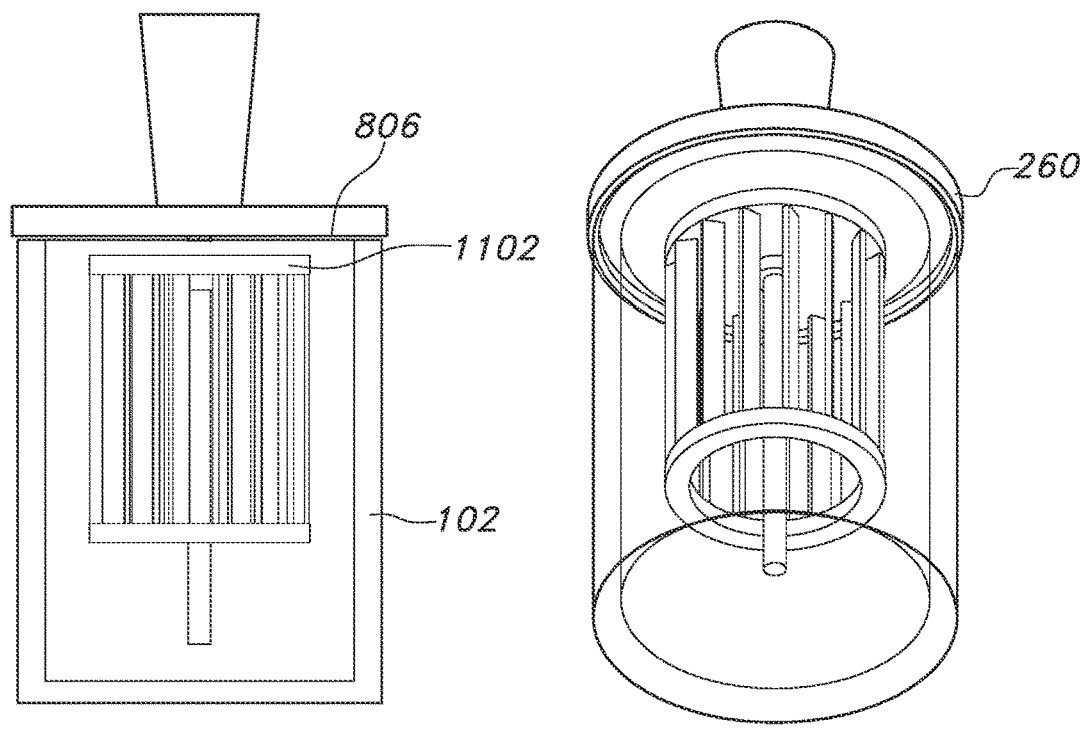
FIG. 15 illustrates an isometric view of a squirrel cage/gate/brace mixer inserted from the top side of the container, in accordance with an exemplary embodiment of the present invention.

FIG. 15 illustrates an isometric view of a squirrel cage/gate/internal brace mixer inserted from the top side 806 of the container 102, in accordance with an exemplary embodiment of the present invention. A container lid 260 connects to a mixing element/squirrel cage/gate/brace mixer 1102. The mixing element i.e., squirrel cage/gate/brace mixer 1102 is attached to the top side opening of the container 102 during the connecting mixer process. The squirrel cage/gate/brace mixer 1102 spins or agitates to mix the base product with the cosmetic additive to create a customized cosmetic product needed by the user. In one embodiment, the squirrel cage/gate/internal brace mixer 1102 is placed inside the container 102 (i.e., around the sidewalls) to house the applicator of a cosmetic product to assist mixing of the content. In one example, the squirrel cage/gate/internal brace mixer around the applicator spins with or without the applicator to mix the content (i.e., cosmetic additive and base product) inside the container 102.

Figure 16:
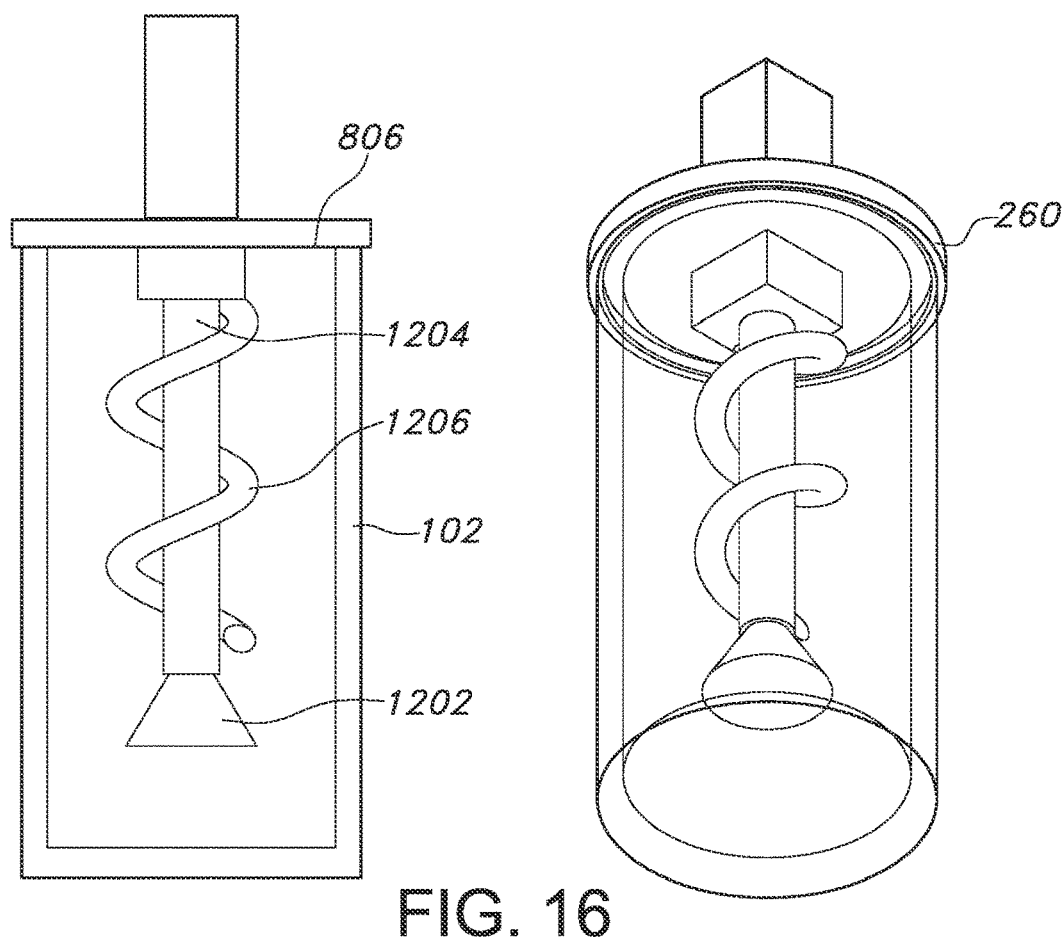
FIG. 16 illustrates an isometric view of a foundation/makeup brush inserted from a top side into the container, in accordance with an exemplary embodiment of the present invention.

FIG. 16 illustrates an isometric view of a foundation/makeup brush inserted from the top side into the container 102, in accordance with an exemplary embodiment of the present invention. A container lid 260 connects to a mixing element 1206. The foundation/makeup brush head 1202 (i.e., applicator) shaft or handle 1204 having mixing element 1206 (i.e., helical/screw mixer) attached therein to assist mixing the content inside the cosmetic container 102 when the foundation/makeup brush spins or rotates using a motor. Further, the foundation/makeup brush head 1202 can be used for applying liquid makeup products by the user.

Figure 17:
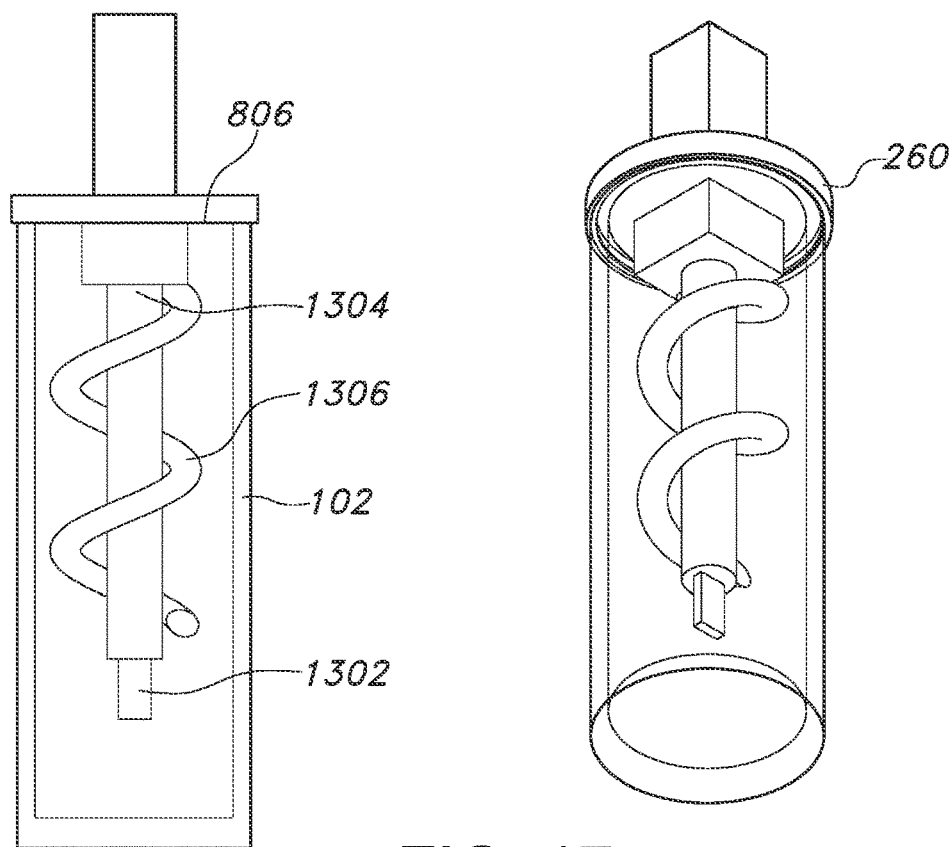
FIG. 17 illustrates an isometric view of a bristle/nail brush applicator having a mixing element, in accordance with an exemplary embodiment of the present invention.

FIG. 17 illustrates an isometric view of a bristle/nail brush applicator having a mixing element, in accordance with an exemplary embodiment of the present invention. The mixing element 1306 is connected to a container lid 260. The bristle/nail brush applicator 1302 having mixing element 1306 (for example, helical/screw mixer) incorporated at the shaft or handle 1304 of bristle/nail brush applicator. The bristle/nail brush applicator 1302 spins with the mixing element in a direction for assisting in mixing the content (i.e., pigment or cosmetic additive and base product) inside the cosmetic container 102 to create a customized nail products. Further, the bristle/nail brush applicator 1302 can be used to apply nail products.

Figure 18:
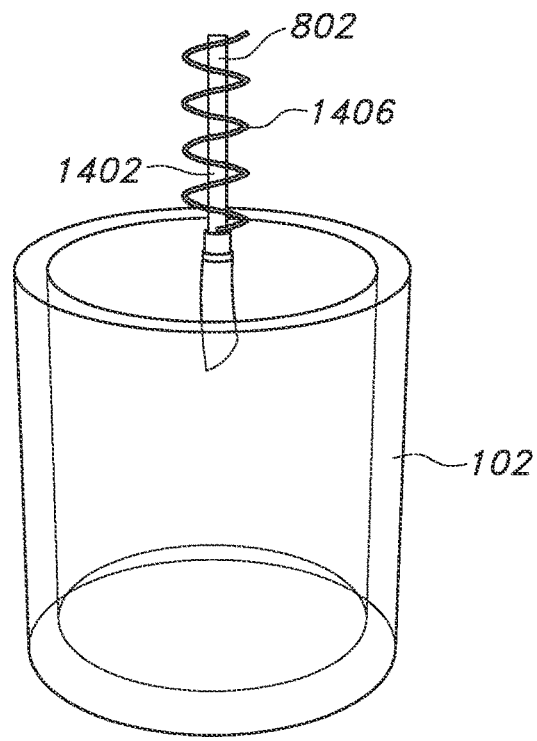
FIG. 18 illustrates an isometric view of a liquid lip product wand with a mixing element incorporated, in accordance with an exemplary embodiment of the present invention.

FIG. 18 illustrates an isometric view of a liquid lip product wand/applicator with the mixing element incorporated, in accordance with an exemplary embodiment of the present invention. The mixing shaft 802 attaches to a top connecting mixer 259 of FIG. 6. The liquid lip product wand/applicator 1402 having a mixing element 1406 incorporated therein, (for example, helical/screw mixer) assists in mixing the content (i.e., pigment or cosmetic additive and base product) inside the container 102 to create a customized liquid lip product.

FIG. 19 shows a front side view of an alternative cosmetic cartridge. In an exemplary embodiment, the cartridge 1502 has a generally rectangular shaped design and is made from a rigid plastic. The cartridge 1502 is filled with cosmetic additives such as pigments. The level of cosmetic additives within the cartridge 1502 is monitored by a sensor electronically connected to a chip 1504 that can report data to computer 202. In an exemplary embodiment, a groove in the top allows the cartridge 1502 to reversibly attach with a single batch cosmetic device 220. In another embodiment, the attachment of the cartridge 1502 to a single batch cosmetic device 220 can be accomplished by a magnet. A port 1506 is shown for connecting the cartridge 1502 to a fluid connection 256 with the dispensing assembly 228. In another example, the cosmetic cartridge filled with cosmetic additives is actuated from at least a top or bottom end of the cosmetic cartridge to create pressure and dispense cosmetic additives from the cosmetic cartridge. Or the pump system can draw cosmetic additive contents from the cosmetic cartridges via a tube or conduit, as shown in FIG. 5. The cosmetic cartridge is actuated using any type of actuator, for example, a linear actuator, stepper, screw, automated actuator system or manual mechanism (i.e., lever or button). In yet another example, the cosmetic cartridge can be an Inkjet cartridge and is heated at a specific point of metal allowing the cosmetic additive to dispense through a vacuum pull.

Figure 20:
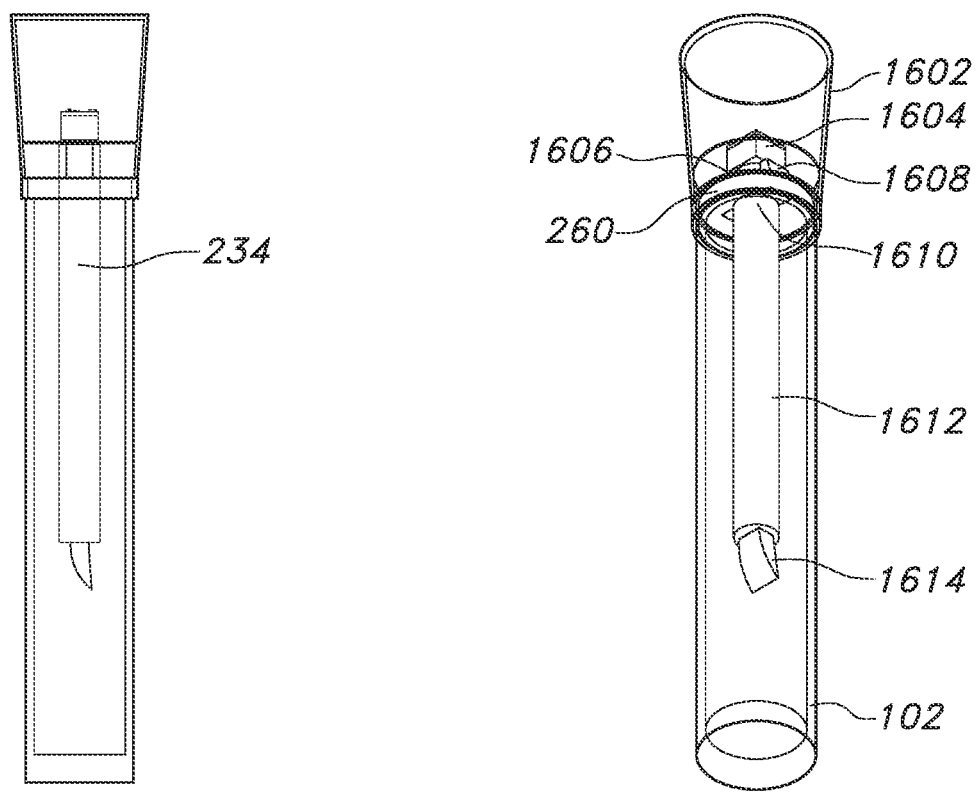
FIG. 20 illustrates an isometric view of a mixing head applicator, in accordance with an exemplary embodiment of the present invention.

FIG. 20 illustrates an isometric view of a mixing head applicator, in accordance with an exemplary embodiment of the present invention. The mixing element 234 includes a cap/handle 1602, a cosmetic applicator shaft 1612, and a mixing head applicator 1614. The cosmetic applicator shaft 1612 is connected to a container lid 260. The cosmetic applicator shaft 1612 is attached to the mixing head applicator 1614. The mixing head applicator 1614, for example, a cosmetic applicator such as liquid lip product wand/applicator, nail product brush, or makeup brush which remains in the cosmetic container 102 and acts as a mixing element. The mixing head (i.e., tip or applicator area of the cosmetic applicator) connected with a motor 1608 to mix, blends, or agitates the content (i.e., cosmetic additive and base product) inside the cosmetic container 102 and the mixing head applicator 1614 can be used to apply makeup. The cosmetic applicator cap/handle 1602 is made of a motor 1608, a power source (i.e., battery) 1606, a controller 1604, and a motor/drive shaft 1610. The cosmetic applicator shaft 1612 rotates relative to the cap/handle 1602. The power source 1606 is operably coupled to the motor 1608 to transfer battery power to the motor 1608. When powered, the motor 1608 rotates the motor/drive shaft 1610 in at least one or more directions. The motor/drive shaft 1610 coupled to the one end of the cosmetic applicator shaft 1612 to rotate the shaft 1612, as a result mixing head also rotates/spins in at least one direction. The controller 1604 coupled between the power source 1606 and the motor 1608 to control the operation of the motor (i.e., adjust a speed of the motor to provide dynamic rotational speed to the mixing head).

In one embodiment, the motor 1608, the power source (i.e., battery) 1606, the controller 1604, and the motor/drive shaft 1610 is configured to drive the cosmetic head applicator in rotation about the applicator's central axis or any other axis. In one example, the motor 1608 is configured to rotate the cosmetic applicator head at a constant speed, or variable speed.

Figure 21:
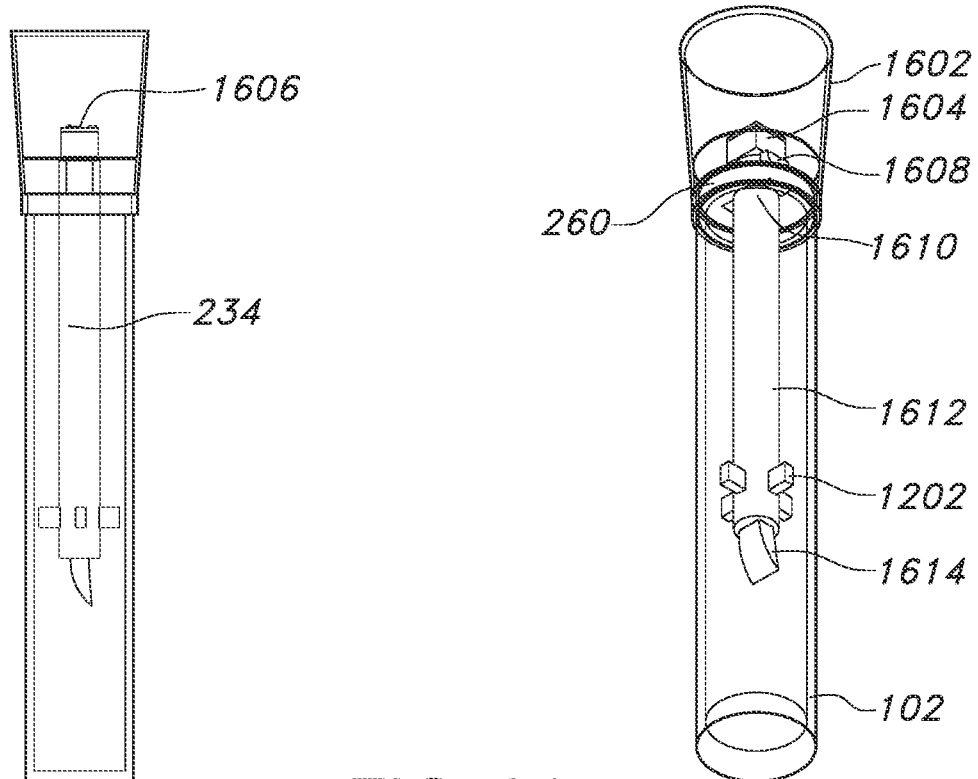
FIG. 21 illustrates an isometric view of a mixing element built-in at the cap of the cosmetic applicator, in accordance with an exemplary embodiment of the present invention.

FIG. 21 illustrates an isometric view of a mixing element 234 built-in at the cap 1602 of the cosmetic applicator, in accordance with an exemplary embodiment of the present invention. The container lid 260 connects the cap 1602 and mixing head applicator 1614 to the container. The cosmetic applicator cap/handle 1602 is made of the motor 1608, the power source (i.e., battery) 1606, the controller 1604, and the mixing element 234. In one embodiment, the mixing element 234 is incorporated at the cosmetic applicator shaft 1612 of the cosmetic applicator. When the cosmetic applicator is inserted into the container 102, the mixing element inside the cap mixes the cosmetic additive and the base inside the container 102. When powered by the battery 1606, the motor 1608 rotates the mixing head applicator 1614 built-in at the cap 1602 in at least one or more direction. The mixing head applicator 1614 can be at least one of the but not limited to a flat blade, curved blade, propeller, gate blades, paddle blade, leaf blades, helical blades, whisk-type blades, scraping blades, or any other type of mixing blades with variable vein counts. The controller 1604 coupled between the power source 1606 and the motor 1608 to control the operation of the motor (i.e., adjust a speed of the motor to provide dynamic rotational speed to the mixing element). In one example, the motor 1608 is configured to rotate the mixing element at a constant speed, or variable speed. In one example, the mixing head applicator 1614 is built-in at the bottom tip of the cosmetic applicator.

Figure 22:
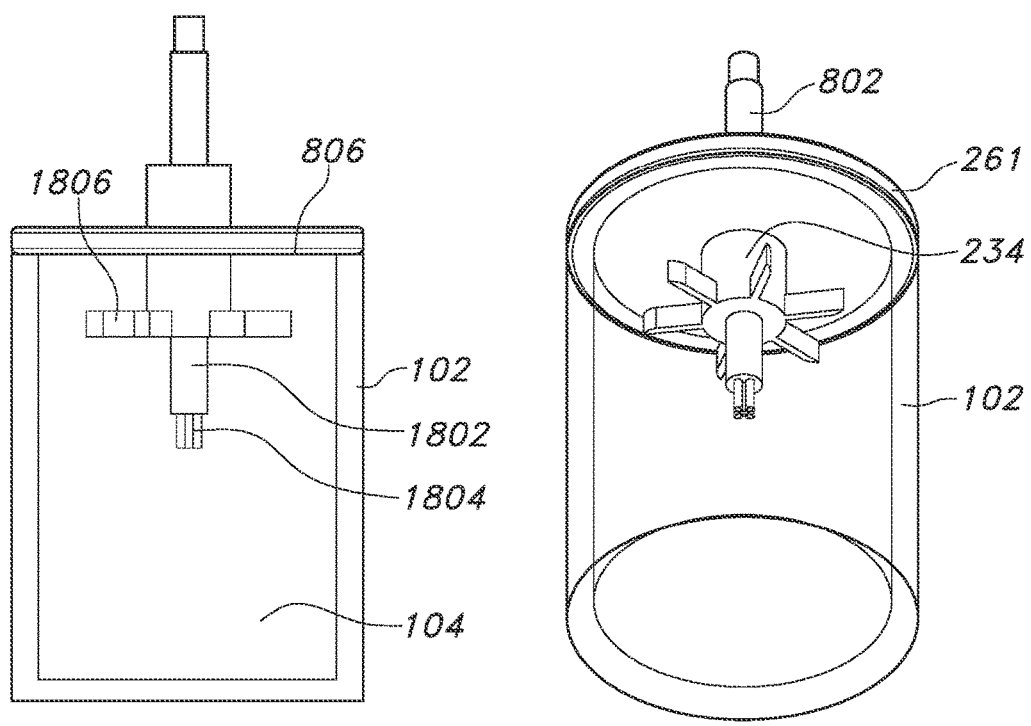
FIG. 22 illustrates an isometric view of a mixing element shaft with fluid conduits, in accordance with an exemplary embodiment of the present invention.

FIG. 22 illustrates an isometric view of a mixing element shaft 1802 with fluid conduits inserted from the top side 806 of the container 102, in accordance with an exemplary embodiment of the present invention. The mixing shaft 802 attaches to a top connecting mixer 259 of FIG. 6. The mixing element shaft 1802 is attached to a mixing element 1806 at one side. The mixing element shaft 1802 having at least one or more fluid conduits 1804 through which pigments or cosmetic additives can pass into the container 102 having the base product 104. In yet another exemplary embodiment, the lid of the container 102 having fluid conduits through which pigments or cosmetic additives can pass into the container 102 having base product. The mixing element 234 can contain a cap 261 for sealing the container 102 during the mixing process. The mixing element shaft 1802 can include a cap 261 for sealing the container 102 during the mixing process.

In some embodiments, the mixing process can be at least one of a magnetic mixing, ultrasonic mixing, vibrational mixing, vortex mixing, static mixing, and gyroscopic mixing-based process.

Figure 23:
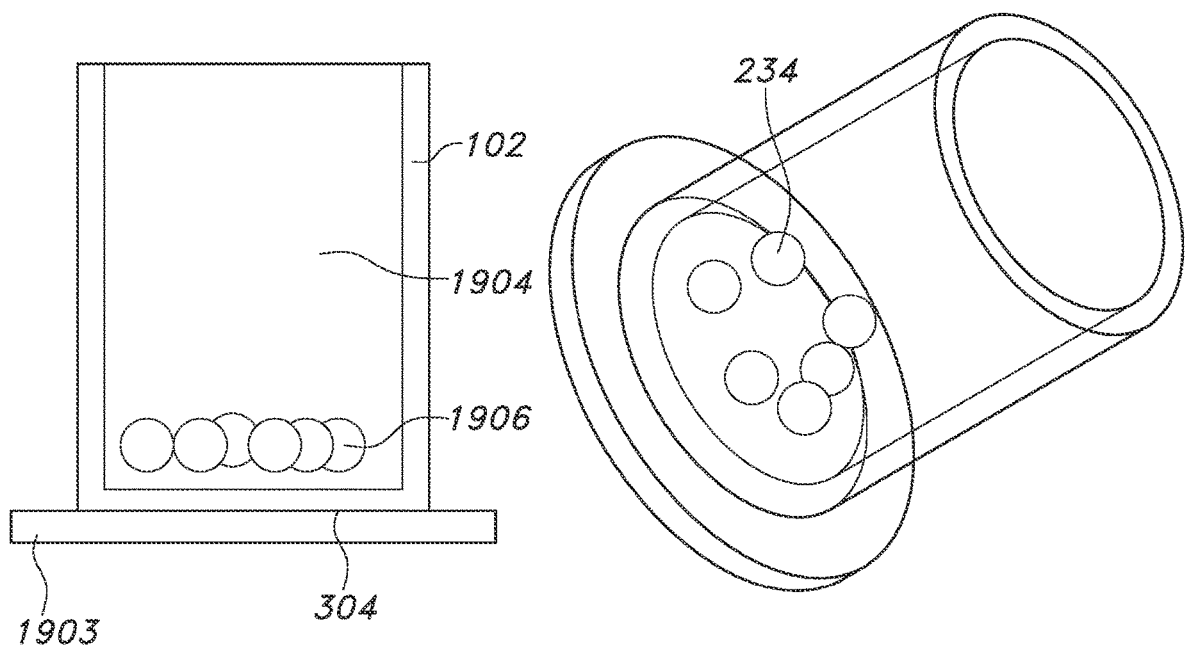
FIG. 23 illustrates a front view of inclusions placed inside the container to assist with a magnetic mixing process, in accordance with an exemplary embodiment of the present invention.
Figure 24:
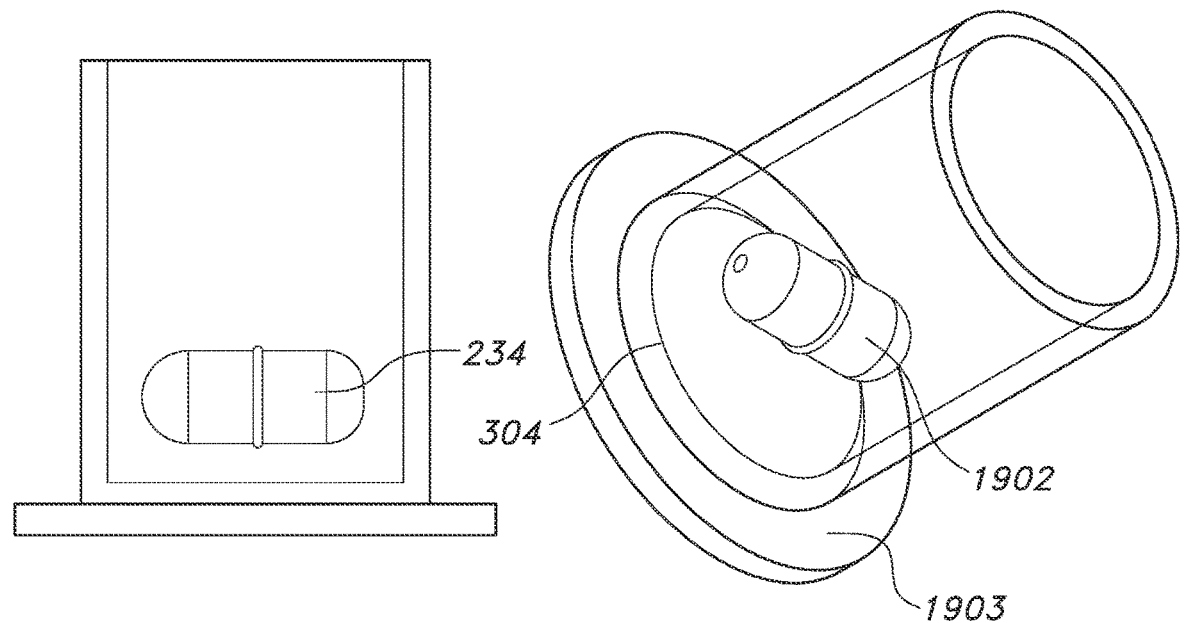
FIG. 24 illustrates a front view of an alternative inclusion placed inside the container to assist with a magnetic mixing process, in accordance with an exemplary embodiment of the present invention.

FIGS. 23 and 24 illustrate a front view of inclusions to facilitate magnetic mixing 1902 placed inside the container 102, in accordance with an exemplary embodiment of the present invention. The container 102 attaches to the bottom connecting mixer 258 of FIG. 5. Also, a magnetic plate (not shown) is used above or below the container 102. The magnetic mixing process having the mixing element, for example, detachable magnetic stir rod 1902 attached to at a center of the bottom side 304 of the container 102 to mix the contents 104 (i.e., cosmetic additive and base product) inside the container 102. The magnetic stir rod 1902 can be removed by the user when not in use or remain in the container. Further, in one example, the mixing element 234 is magnetic inclusions such as ball bearings 1906 are placed at the bottom side 304 of the container 102 to facilitate mixing of the content 104 (i.e., cosmetic additive and base product).

Figure 25:
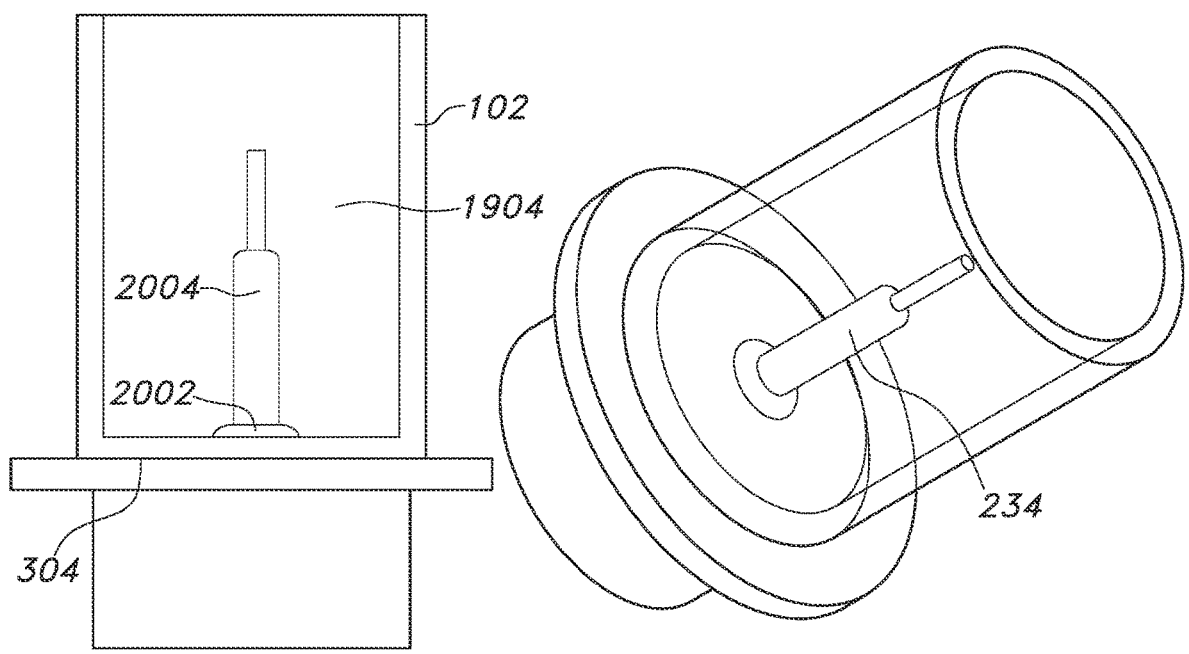
FIG. 25 illustrates an isometric view of an ultrasonic/vibrational mixing element placed inside the container, in accordance with an exemplary embodiment of the present invention.

FIG. 25 illustrates an isometric view of an ultrasonic/vibrational mixing element 2002 placed inside the container 102, in accordance with an exemplary embodiment of the present invention. The ultrasonic/vibrational mixing element 2002 is fixed or detachably attached at a center of the bottom side 304 of the container 102 to the bottom connecting mixer 258 of FIG. 5. The mixing element 234 mixes the cosmetic additives with the base product 104 inside the container 102. Further, a sheath 2004 can be used over the ultrasonic/vibrational mixing element 2002 to prevent contact of the content (pigment/cosmetic additives and base product) 104 with the ultrasonic/vibrational mixing element 2002 inside the container 102. The vibrational mixing element can be used to shake or vibrate the container 102 to mix the content inside the container 102. The vibrational mixing element is at least one of the but not limited to a mechanical oscillation element, piezoelectric components, or any other element. In another exemplary embodiment, the container 120 is designed in a manner (i.e., changes to the shape, size of the container) to facilitate vortex mixing or gyroscopic mixing process.

Figure 26:
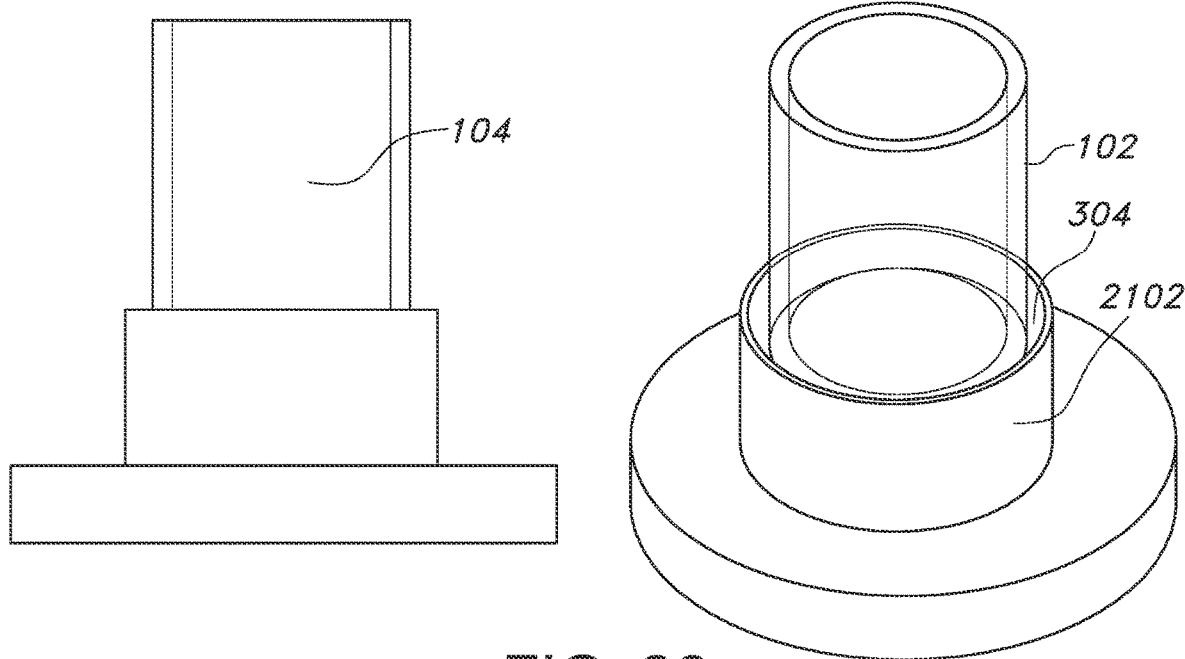
FIG. 26 illustrates an isometric view of a vortex or gyroscopic mixing process, in accordance with an exemplary embodiment of the present invention.

FIG. 26 illustrates an isometric view of a vortex mixing process, in accordance with an exemplary embodiment of the present invention. The container 102 is placed over a rubber baseplate 2102 so that the container bottom side 304 snugly fit into the rubber baseplate 2102. The rubber baseplate 2102 is attached or mounted to the bottom connecting mixer 258 of FIG. 5. An electric motor with a drive shaft powers the mixing process. As the motor runs the rubber baseplate 2102 oscillates in a circular motion, and the motion is transmitted to the content 104 inside the container 102 and a vortex is created. The vortex mixes or agitates the content 104 inside the container 102.

In another embodiment, the mixing process can be at least one of a magnetic mixing, ultrasonic mixing, vibrational mixing, vortex mixing, static mixing, and gyroscopic mixing-based process. The magnetic mixing process having the mixing element, for example, magnetic stir rod detachably attached to the container 102 to mix the contents (i.e., cosmetic additive and base product) inside the container 102. The magnetic stir rod 1902 of FIG. 24 can be removed by the user when not in use.

In one example, the magnetic plate 1903 is used above or below the container 102 and magnetic inclusions 1906 such as ball bearings 1906 or stirring rods 1902 of FIG. 22A-B to mix with the content of the container 102. In another example, at least one or more magnets in the bottom connecting mixer 258 of FIG. 6 can power the mixing element within the container 102 wherein the mixing element can be impeller blade, bottom plate mixer, or any other type of mixing element.

In one exemplary embodiment, the ultrasonic mixing process includes the ultrasonic mixing element that can be inserted into the container 102 to mix the content. In one example, at least one ultrasonic/vibrational mixing element 2002 of FIG. 25 is paired or connected at a top or bottom of a mixing element to agitate the content inside the container 102. The ultrasonic/vibrational mixing element 2002 can be used to shake or vibrate the container to mix the content inside the container 102. The ultrasonic/vibrational mixing element 2002 is at least one of the but not limited to a mechanical oscillation element, piezoelectric components, or any other element. In one example, the container is designed in a manner (i.e., changes to the shape, size of the container) to facilitate vortex mixing or gyroscopic mixing process.

Figure 27:
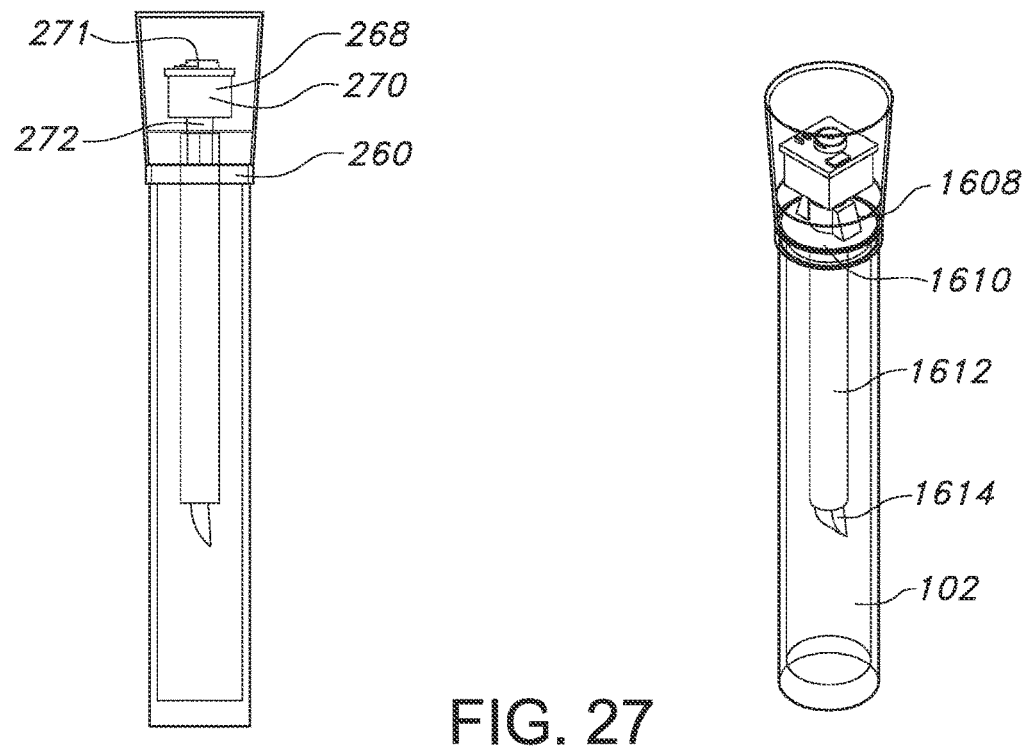
FIG. 27 illustrates a small mix actuator, a portable mixing device.

Now referring to FIG. 27, an exemplary mixing device is a small mixer actuator. The mixing assembly 230 of the container 120 connects to a power connection 272 of a mixing device, such a small mix actuator 268 shown in FIG. 27. The portable mix actuator 270 is operably connected to the motor/drive shaft 1610. In an exemplary embodiment, the container 102 contains a mixing motor 1601. Alternatively, the small mixer actuator 268 can include a mixing motor 1608. The mixing motor 1608 rotates or spins the cosmetic applicator shaft 1612 and the mixing head applicator 1614. The small mixer actuator can include a battery 271 for providing power to the motor.

Embodiments of the present invention provide mason/screw top jar container (i.e., mason jar-like bottle) having a base product and has a plastic seal above the fluid level. The plastic seal is removed, and cosmetic additives are dispensed into the container from the cosmetic cartridge. After dispensing, a "bottleneck" or "bottleneck and applicator" can be screwed onto the threads on the top of the mason jar container. The base product and cosmetic additive can be mixed from the top or from the bottom to be mixed with a mixing assembly.

Embodiments of the present invention provide a single batch cosmetic device 220 to create a desired customized product based on user inputs such as color or pigment/cosmetic additive selection. Pigment/cosmetic additive is dispensed to tint the base product to the selected color in the container. The single batch cosmetic device is configured to create a different customized cosmetic product using at least one mixing process from the plurality of mixing processes. The mixing process is at least one of but not limited to a homogenizer, propeller/impeller mixer, gate/squirrel cage mixer, helical/spiral/screw mixer, homogenizing tip/impeller blade, generic mixing element, mixing shaft and mixer, foundation/makeup brush, bristle/nail brush applicator having a mixing element, liquid lip product wand/applicator with mixing element, a magnetic mixing, ultrasonic mixing, vibrational mixing, vortex mixing, static mixing, and gyroscopic mixing-based process.

The base product for liquid lip products can include emollients, waxes, colorants (pigment), thickening agents, and other additives such as fragrance or flavoring agents. Control agents can also be added to combat microbial growth. In one exemplary embodiment, the container for lip liquid lip products includes Hydrogenated Polyisobutene, Ethylene/Propylene/Styrene Copolymer, Butylene/Ethylene/Styrene Copolymer; Titanium Dioxide; a plurality of waxes: beeswax, carnauba, sumac wax, candelilla wax, ozokerite; a plurality of oils: lanolin, polybutene, almond, coconut, avocado, jojoba, castor oil, linseed oil, sesame oil, shea butter, and silicone-based oils. The base product can be either a translucent product, a white-based product to have color added, the white pigment of the single batch device to provide the proper proportions of white in a certain shade (with the base product being a translucent mixture), or any of the previous three mixtures with additional cosmetic additive added. When the base product contains additional cosmetic additive added, a user can be adjusting the color of a prior custom cosmetic product. The base product for nail polish can include polymers dissolved into a volatile, organic solvent, nitrocellulose dissolved in butyl acetate or ethyl acetate. Common ingredients also include plasticizers (prevent brittleness), dyes and pigments, opalescent (enhance coloration), adhesive polymers (ensure nitrocellulose adheres to surface of nail), thickening agents (prevent premature settling of pigments), and ultraviolet stabilizers (resist color change when exposed to sunlight). In one exemplary embodiment, the container for nail polish includes Butyl Acetate, Ethyl Acetate, Nitrocellulose, Adipic Acid/Neopentyl Glycol/Trimellitic Anhydride Copolymer, Acetyl Tributyl Citrate, Isopropyl Alcohol, Acrylates Copolymer, Stearalkonium Bentonite, N-Butyl Alcohol, Styrene/Acrylates Copolymer, Benzophenone-1, Silica, Alumina, Trimethylpentanediyl Dibenzoate, Titanium Dioxide, and a choice of oil. In an additional embodiment, the container for nail polish includes a nitrocellulose-free, water-based formula with adhesive polymers. The base product for the liquid makeup can include oils and emollients, water, silicone (dimethicone, polysiloxane, etc.), oils, and colorants. In one exemplary embodiment, the base product for the liquid makeup/foundation can include Water, emulsifying ingredients such as Dimethicone Crosspolymer or Polysilicone-11, Titanium Dioxide, Iron Oxides, viscosity controlling ingredients such as Isohexadecane and Cyclomethicone, mineral clays such as Silica or Kaolin, emollients such as Glycerin or Squalane, and Natural Preservatives.

While the invention has been described in detail with specific reference to embodiments thereof, it is understood that variations and modifications thereof is made without departing from the true spirit and scope of the invention.

We claim:

1. A system to mix a plurality of types of cosmetic products comprising:

a computer application deployed on an interface device to facilitate a cosmetic product selection and a cosmetic additive selection; wherein the cosmetic additive selection is comprised of an at least a color selection, wherein the cosmetic product selection is made of at least a product selection;

a single batch cosmetic device in electronic communication with the interface device, wherein the interface device is configured to input the cosmetic product selection and the cosmetic additive selection to the single batch cosmetic device; the single batch cosmetic device comprised of:

a computing system comprising: a controller configured to control the operations of the single batch cosmetic device, a plurality of cosmetic cartridges for the cosmetic additive, and a dispensing assembly, wherein the dispensing assembly is comprised of a plurality of fluid connections; wherein each of the fluid connections are in direct fluid connection with the plurality of cosmetic cartridges; and a plurality of pumps and a plurality of pump motors for controlling the dispensing of at least one dispensing a unit of cosmetic additive from at least one of the plurality of cosmetic cartridges to dispense through at least one of the plurality of fluid connections; wherein the interface device is configured to input the command code to the dispensing assembly to dispense the at least one cosmetic additive to formulate the plurality of types of cosmetic products, wherein one of the plurality of types of cosmetic products is lip gloss; wherein the single batch cosmetic device includes a bottom plate configured to hold one of a plurality of removable containers, a mixing assembly comprising an at least one bottom connecting mixer configured to spin a mixing element, wherein the mixing element is comprised of a shaft with a mixing head said system comprised of a plurality of mixing elements, wherein each mixing element of the plurality of mixing elements is integrally located within each of the plurality of removable containers, wherein each of the plurality of removable containers contains a base-specific for the cosmetic product selection, said bottom plate configured to position one of the plurality of removable containers to receive the unit of cosmetic additive from the dispensing assembly.

2. The system of claim 1, further comprising a portable mix actuator, comprised the at least one connecting mixer configured to attach to the mixing element and a motor to spin the mixing element.

* * * * *